United States Patent
Berkner et al.

(10) Patent No.: US 6,813,387 B1
(45) Date of Patent: Nov. 2, 2004

(54) TILE BOUNDARY ARTIFACT REMOVAL FOR ARBITRARY WAVELET FILTERS

(75) Inventors: Kathrin Berkner, Palo Alto, CA (US); Edward L. Schwartz, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/515,458

(22) Filed: Feb. 29, 2000

(51) Int. Cl.$^7$ .............................................. G06K 9/36
(52) U.S. Cl. ........................ 382/240; 382/238; 382/239
(58) Field of Search ............................ 382/240, 251, 382/239, 233, 248, 238; 375/240.05, 240.11

(56) References Cited

U.S. PATENT DOCUMENTS

| | | | |
|---|---|---|---|
| 5,764,805 A | * | 6/1998 | Martucci et al. ............ 382/238 |
| 5,991,454 A | * | 11/1999 | Fowler ........................ 382/251 |
| 6,141,446 A | * | 10/2000 | Boliek et al. ................ 382/233 |
| 6,389,074 B1 | * | 5/2002 | Andrew .................. 375/240.05 |

OTHER PUBLICATIONS

Zakhor, "Iterative Procedure for Reduction of Blocking Effects in Transform Image Coding", IEEE Transactions on Circuits and Systems for Video Technology, Mar. 1992, vol. 2, No. 1, pps. 91–95.*

* cited by examiner

*Primary Examiner*—Anh Hong Do
(74) *Attorney, Agent, or Firm*—Blakely, Sokoloff, Taylor & Zafman LLP

(57) ABSTRACT

Tile boundary artifact removal is performed with arbitrary wavelet filters. In one embodiment, the method includes decompressing a plurality of sets of compressed data, including performing detiling on a first set of compressed data using neighbor information from at least one other set of compressed data, and recombining the plurality of decompressed tiles into an image.

38 Claims, 17 Drawing Sheets

| Level 2 | | | $s^2_{k-4}$ | | $\tilde{d}^2_{k-2}$ | | $\tilde{s}^2_k$ | | $\tilde{d}^2_{k+2}$ | | $s^2_{k+4}$ | |
|---|---|---|---|---|---|---|---|---|---|---|---|---|
| Level 1 | | | | | | | | | | | | |
| Level 0 | | | | | | | | | | | | |

FIG. 3A

| Level 2 | | | $s^2_{k-4}$ | | $\tilde{d}^2_{k-2}$ | | $\tilde{s}^2_k$ | | $\tilde{d}^2_{k+2}$ | | $s^2_{k+4}$ | |
|---|---|---|---|---|---|---|---|---|---|---|---|---|
| Level 1 | $s^1_{k-6}$ | | $s^1_{k-4}$ | | $s^1_{k-2}$ | | $\tilde{s}^1_k$ | | $s^1_{k+2}$ | | $s^1_{k+4}$ | |
| Level 0 | | | | | | | | | | | | |

FIG. 3B

| Level 2 | | | | | $\bar{s}^2_{k-2}$ (301) | | | | $\bar{s}^2_{k+2}$ (302) | | | |
|---|---|---|---|---|---|---|---|---|---|---|---|---|
| Level 1 | $s^1_{k-6}$ | | $s^1_{k-4}$ | | $s^1_{k-2}$ | | $\tilde{s}^1_k$ | | $s^1_{k+2}$ | | $s^1_{k+4}$ | |
| Level 0 | | | | | | | | | | | | |

| Position Index 502 | Scaling Coefficient 501 | Position Index 504 | Wavelet Coefficient 503 |
|---|---|---|---|
| $s_{index-7}$ | 0.00000000 | $d_{index-7}$ | 0.00000000 |
| $s_{index-6}$ | 0.00000000 | $d_{index-6}$ | 0.00000000 |
| $s_{index-5}$ | 0.00000000 | $d_{index-5}$ | 0.00000000 |
| $s_{index-4}$ | 0.157085 | $d_{index-4}$ | 0.00000000 |
| $s_{index-3}$ | 0.334000 | $d_{index-3}$ | 0.00000000 |
| $s_{index-2}$ | 0.486379 | $d_{index-2}$ | 0.00000000 |
| $s_{index-1}$ | 0.610983 | $d_{index-1}$ | 0.00000000 |
| $s_{left}$ | 0.706447 | $d_{left}$ | 0.000128 |
| $s_{left+1}$ | 0.686510 | $d_{left+1}$ | 0.00000000 |
| $s_{left+2}$ | 0 | $d_{left+2}$ | 0.00000000 |
| $s_{right-1}$ | 0.094548 | $d_{right-1}$ | 0.00000000 |
| $s_{right}$ | 0.044662 | $d_{right}$ | 0.00000000 |
| $s_{index}$ | 0.060945 | $d_{index}$ | 0.000156 |
| $s_{index+1}$ | 0.0662969 | $d_{index+1}$ | 0.00000000 |
| $s_{index+2}$ | 0.824977 | $d_{index+2}$ | 0.00000000 |
| $s_{index+3}$ | 0.815467 | $d_{index+3}$ | 0.00000000 |
| $s_{index+4}$ | 0.786274 | $d_{index+4}$ | 0.00000000 |
| $s_{index+5}$ | 0.00000000 | $d_{index+5}$ | 0.00000000 |
| $s_{index+6}$ | 0.00000000 | $d_{index+6}$ | 0.00000000 |

FIG. 5A

| Scaling Coefficients At Level Without Detailing 550 | Value 551 | Detailing Correction 552 | Value 553 |
|---|---|---|---|
| $s_{index-4}$ | 0.469672 | | |
| $s_{index-3}$ | 0.500821 | | |
| $s_{index-2}$ | 0.526819 | | |
| $s_{index-1}$ | 0.547764 | | |
| $s_{index}$ | 0.143099 | $s_{index}$ | 0.278903 |
| $s_{index+1}$ | 0.575096 | | |
| $s_{index+2}$ | 0.581870 | | |
| $s_{index+3}$ | 0.584356 | | |
| $s_{index+4}$ | 0.582806 | | |

| Scaling Coefficients | Position: Index-1 | Position: Index | Wavelet Coefficient | Position: Index-1 | Position: Index |
|---|---|---|---|---|---|
| $s_{index-4}$ | 0.00000000 | 0.00000000 | $d_{index-4}$ | 0.00000000 | 0.00000000 |
| $s_{index-3}$ | 0.00000000 | 0.00000000 | $d_{index-3}$ | 0.00000000 | 0.00000000 |
| $s_{index-2}$ | -0.04419417 | -0.02209709 | $d_{index-2}$ | 0.00000000 | 0.00000000 |
| $s_{index-1}$ | 0.39774756 | 0.17677670 | $d_{index-1}$ | -0.04419417 | -0.04419417 |
| $s_{left}$ | 0.26516504 | 0.11048543 | $d_{left}$ | 0.30935922 | 0.13258252 |
| $s_{left+1}$ | 0.00000000 | 0.00000000 | $d_{left+1}$ | 0.00000000 | 0.00000000 |
| $s_{right}$ | 0.00000000 | 0.00000000 | $d_{right}$ | 0.04419417 | 0.04419417 |
| $s_{index}$ | 0.13258252 | 0.28726213 | $d_{index}$ | -0.30935922 | -0.13258252 |
| $s_{index+1}$ | -0.04419417 | 0.17677670 | $d_{index+1}$ | 0.00000000 | 0.00000000 |
| $s_{index+2}$ | 0.00000000 | -0.02209709 | $d_{index+2}$ | 0.00000000 | 0.00000000 |
| $s_{index+3}$ | 0.00000000 | 0.00000000 | $d_{index+3}$ | 0.00000000 | 0.00000000 |
| $s_{index+4}$ | 0.00000000 | 0.00000000 | $d_{index+4}$ | 0.00000000 | 0.00000000 |

FIG. 6

| Scaling Coefficients | Position: Index-2 | Position: Index-1 | Position: Index | Position: Index+1 |
|---|---|---|---|---|
| $s_{index-8}$ | 0.00000000 | 0.00000000 | 0.00000000 | 0.00000000 |
| $s_{index-7}$ | 0.00000000 | 0.00000000 | 0.00000000 | 0.00000000 |
| $s_{index-6}$ | 0.00000000 | 0.00000000 | 0.00000000 | 0.00000000 |
| $s_{index-5}$ | 0.00009934 | -0.00000345 | -0.00000547 | 0.00000000 |
| $s_{index-4}$ | -0.00289854 | 0.00010072 | 0.00015976 | 0.00015757 |
| $s_{index-3}$ | 0.02383210 | -0.00082936 | -0.00131548 | -0.00256488 |
| $s_{index-2}$ | -0.11963735 | 0.00275537 | 0.00437039 | 0.01670317 |
| $s_{index-1}$ | 0.45571269 | 0.01680515 | -0.01292635 | -0.05310844 |
| $s_{left}$ | 0.28130945 | 0.11442141 | 0.03953570 | 0.03581807 |
| $s_{left+1}$ | 0.04397312 | 0.01674578 | 0.00553959 | 0.00551599 |
| $s_{right}$ | 0.00000000 | 0.00000000 | 0.00000000 | 0.00000000 |
| $s_{right+2}$ | 0.00000000 | 0.00000000 | 0.00000000 | 0.00000000 |
| $s_{right}$ | 0.00355485 | 0.04583891 | 0.03312509 | 0.02535031 |
| $s_{index}$ | 0.17084839 | 0.65671393 | 0.35103670 | 0.19573403 |
| $s_{index+1}$ | -0.07566423 | -0.01969809 | 0.43036586 | 0.51008466 |
| $s_{index+2}$ | 0.02383210 | -0.00060906 | -0.06550493 | 0.15991596 |
| $s_{index+3}$ | -0.00289854 | 0.00002443 | 0.00003875 | -0.07845875 |
| $s_{index+4}$ | 0.00009934 | 0.00001276 | 0.00002024 | 0.01670317 |
| $s_{index+5}$ | 0.00000000 | -0.00000249 | -0.00000395 | -0.00256488 |
| $s_{index+6}$ | 0.00000000 | 0.00000015 | 0.00000024 | 0.00015757 |
| $s_{index+7}$ | 0.00000000 | 0.00000000 | 0.00000000 | 0.0000000 |

FIG. 7

| Wavelet Coefficients | Position: Index-2 | Position: Index-1 | Position: Index | Position: Index+1 |
|---|---|---|---|---|
| $d_{index-8}$ | 0.00000000 | 0.00000000 | 0.00000000 | 0.00000000 |
| $d_{index-7}$ | 0.00000000 | 0.00000000 | 0.00000000 | 0.00000000 |
| $d_{index-6}$ | 0.00000000 | -0.00009235 | 0.00000000 | 0.00000000 |
| $d_{index-5}$ | 0.00000000 | 0.00117515 | -0.00005823 | 0.00000000 |
| $d_{index-4}$ | 0.00000000 | -0.00010072 | 0.00149201 | 0.00000000 |
| $d_{index-3}$ | 0.00000000 | 0.04304622 | -0.00964886 | 0.00000000 |
| $d_{index-2}$ | -0.00467033 | -0.09847363 | 0.05869357 | -0.01071267 |
| $d_{index-1}$ | 0.01699472 | -0.18676902 | -0.17409230 | 0.00436548 |
| $d_{left}$ | 0.14193384 | 0.16706506 | 0.0915937 | 0.05122894 |
| $d_{left+1}$ | 0.01956577 | 0.01304549 | 0.00271315 | 0.00423674 |
| $d_{right}$ | 0.00000000 | 0.00000000 | 0.00000000 | 0.00000000 |
| $d_{right+2}$ | 0.00467033 | 0.01347240 | 0.02562251 | 0.01071267 |
| $d_{right}$ | 0.01699472 | 0.04090759 | 0.07272729 | 0.00436548 |
| $d_{index}$ | 0.14193384 | 0.27881860 | 0.48363701 | -0.05122894 |
| $d_{index+1}$ | -0.01956577 | -0.15473435 | -0.27741594 | 0.00423674 |
| $d_{index+2}$ | 0.00000000 | 0.05677013 | 0.08813114 | -0.00000000 |
| $d_{index+3}$ | 0.00000000 | -0.00925394 | -0.01096135 | 0.00000000 |
| $d_{index+4}$ | 0.00000000 | 0.00117515 | 0.00149201 | 0.00000000 |
| $d_{index+5}$ | 0.00000000 | -0.00009235 | -0.00005823 | 0.00000000 |
| $d_{index+6}$ | 0.00000000 | 0.00000000 | 0.00000000 | 0.00000000 |
| $d_{index+7}$ | 0.00000000 | 0.00000000 | 0.00000000 | 0.00000000 |

FIG. 8

TILE BOUNDARY ARTIFACT REMOVAL FOR ARBITRARY WAVELET FILTERS

FIELD OF THE INVENTION

The present invention relates to the field of data processing; more particularly, the present invention relates to removing tile boundary artifacts when using arbitrary wavelet filters.

BACKGROUND OF THE INVENTION

For practical image compression systems, handling images divided into independent tiles in the pixel domain as well as in the transform coefficient domain is important. A partition into simple rectangular tiles is the most convenient method for implementation. Tiling allows rectangular regions-of-interests (ROI), as either an encoder option or a decoder option, and aids low memory operation and parallel processing.

Unfortunately, naive decoding for independent tiles in a wavelet based lossy compression system can create visible tile boundary artifacts. Artifacts introduced by lossy full-frame wavelet-based image compression generally appear as being "smooth", e.g., ringing around edges in the decompressed image, but not really "sharp" or "peaky". That is, in a lossy compressed version of an image computed using wavelet transforms on independent tiles of the original image, a decompressed tile itself looks smooth, but the transition to the next tile can become a sharp edge-type boundary. These tile-boundary artifacts occur because transform coefficients used for quantization are computed from disjoint sets of pixels. These artifacts can occur regardless of the filter chosen. No matter what filter or what extension rule is used at the boundaries (symmetric extension, replication, anti-symmetric extension), in general, it will not match the actual image on the other side of the boundary and cause artifacts for some images. The tile-boundary artifacts are often viewed as unacceptable, particularly at low bitrates.

Significant work has been done in the field of block-artifact removal of DCT-compressed images. One approach to removal of tile boundary artifacts is to apply a postprocessing step and simply smooth the decompressed image boundaries with a lowpass filter. However, in order to provide a successful solution, this approach requires an image model and does not work for arbitrary images. In general, smoothing via lowpass filters at boundaries introduces new artifacts.

Another approach is a detiling solution that is incorporated into the decoder and uses information from various quantized wavelet coefficients. One approach that matches this criterion for the DCT is described in Section K8 of the JPEG standard. See W. G. Pennebaker and J. L. Mitchell, *JPEG—Still Image and Data Compression Standard*, Van Norstrand Reighhold, New York, 1993. This method works on the quantized coefficients and uses them to compute a polynomial fit through the given coefficients. Since the polynomial model is not naturally associated with a DCT, this approach requires rather complex calculations. Another well-known approach is the Projection Onto Convex Sets. See, A. Kakhor, "Iterative Procedure for Reduction of Blocking Effects in Transform Coding," *IEEE Trans. Circ. Sys.*, vol. 2, no. 1, pp. 91–95, 1992. This method needs a model that cannot be specified in the transform domain and requires an iterative scheme switching back and forth between the transform and the data domain causing high computational cost.

A way to avoid block artifacts in wavelet-based compression is presented in J. K. Eom, Y. S. Kim, and J. H. Kim, "A Block Wavelet Transform for Sub-band Image Coding/Decoding," in *SPIE Electronic Imaging*, vol. 2669, (San Jose, Calif.), pp. 169–77, January 1996. In this approach, wavelet coefficients of overlapping tiles are computed. The overlap-size depends on the maximal level of decompression in the wavelet tree. Storing wavelet coefficients computed from overlap regions is equivalent to storing selected coefficients from the full-frame decomposition. The higher the level of decomposition, the more full-frame wavelet coefficients have to be stored. "Line-based" or "rolling buffer" methods have similar storage requirements. These methods complicate random access to memory and parallel processing.

SUMMARY OF THE INVENTION

A method for processing data is described. In one embodiment, the method includes decompressing a plurality of sets of compressed data, including performing detiling on a first set of compressed data using neighbor information from at least one other set of compressed data, and recombining the plurality of decompressed tiles into an image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A–3E illustrate operations of the process of FIG. 2 in a schematic overview.

FIG. 5A illustrates one embodiment of filter coefficients for detiling at scale L=2 for the 3–9 wavelet system.

FIG. 6 illustrates one embodiment of filter coefficients for detiling at scale L=2 for the 5–3 wavelet system.

FIGS. 7 and 8 illustrate one embodiment of filter coefficients for detiling at scale L=2 for the Daub 9–7 wavelet system.

DETAILED DESCRIPTION

Figure 1A:
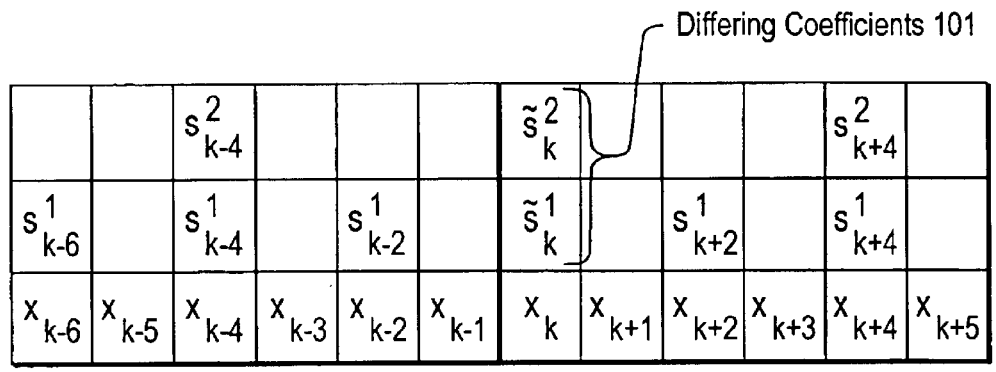
FIG. 1A illustrates a schematic overview of the lowpass coefficients calculated with the transform on tiles.

A tile boundary artifact removal method and apparatus are described. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Detiling Solutions Via Smooth Approximations for Arbitrary Biorthogonal Wavelet Filters A method and apparatus for performing detiling using smooth approximations using wavelet filters, such as, for example, biorthogonal wavelet filters. The solution described herein is incorporated in the decoder and makes use of the smoothness properties of wavelet systems.

One embodiment of the detiling technique for arbitrary biorthogonal wavelet filters obtains smooth reconstructions throughout tiles, where "smooth" is defined as the smoothness of the chosen synthesis wavelet system. This approach differs from the other methods where the natural smoothness properties of wavelet systems are not being exploited. The technique may be applied to many compression schemes such as those that use a 3-5 filter or the Daubechies 7-9 filter. The technique may also be applied to schemes that use a 2,10 filter or a 2,6 filter, such as those described in U.S. patent application Ser. No. 08/498,695 entitled "Method and Apparatus for Compression using Reversible Wavelet Transforms and an Embedded Codestream," filed Jun. 20, 1995 and U.S. Pat. No. 5,881,176, entitled "Compression and Decompression with Wavelet Style and Binary Style Including Quantization by Device Dependent Parser," filed May 3, 1996.

One or more embodiments described herein have one or more of the following benefits. First, the artifact removal eliminates visual degradations at tile boundaries. Second, the technique described herein is a decoder option. Thus, there is no cost during encoding, lossless decoding, and high bitrate decoding. The technique also does not rely on ad hoc image models. That is, it provides smoothing matched to the smoothing caused by lossy wavelet compression.

In order to discuss the techniques described herein, the following sets forth characteristics of wavelet filters. To obtain a decompressed image that is smooth at the tile boundaries, a quality target image $I_q$ is considered that differs from level (scale) to level. At each reconstruction level (scale) J of the decompressed image $I_c$, the image obtained using the full-frame wavelet decomposition of the original image I modified only at those highpass coefficients at level J that are affected by the boundary corrections in the tile transform is chosen as the quality target image $I_q$. The modified coefficients are all set to zero. Due to the nature of the wavelet transform, the decompressed image has the same degree of smoothness as the synthesis scaling function that is determined by the synthesis lowpass filter. In order to remove the tile-boundary artifacts, a correction of the tile highpass coefficients at a scale J using the neighboring lowpass coefficients at the same scale is described.

In the following paragraph, one step of this inverse transform in one dimension is demonstrated. The full-frame wavelet decomposition of the quality measure is given by lowpass coefficients $s^j$ and highpass coefficients $d^j$ for j=1, . . . , J. In the process of computation of the lowpass coefficients $s^J$ at the coarsest scale, the lowpass coefficients at all scales $s^j$, j=1, . . . , J–1 have to be computed in intermediate steps, but only the coarsest scale has to be stored. The coefficients are associated with the lowpass operator H and the highpass operator G, i.e.

$$s^j = H s^{j-1} \text{ and } d^j = G s^{j-1}, \quad (1)$$

followed by downsampling. In contrast, the tile wavelet decomposition (resulting from the application of the wavelet transform to tiles independently) is given by coefficients $\tilde{s}^J$ and $\tilde{d}^j$, where j=1, . . . , J, computed using the operators $\tilde{H}$ and $\tilde{G}$, i.e.

$$\tilde{s}^j = \tilde{H} \tilde{s}^{j-1} \text{ and } \tilde{d}^j = \tilde{G} \tilde{s}^{j-1}.$$

Both operator schemes are applied to all coefficients. The difference between the two schemes is that $\tilde{H}$ and $\tilde{G}$ include the boundary operations at the tile boundaries and the image boundaries. Whereas H and G include boundary operations only at the image boundary. To compute the inverse transforms, the synthesis operators $H^*$, $\tilde{H}^*$, $G^*$ and $\tilde{G}^*$ are necessary. One step of the inverse transforms is performed as $$s^{j-1} = H^* s^j + G^* d^j \text{ and } \tilde{s}^{j-1} = \tilde{H}^* \tilde{s}^j + \tilde{G}^* \tilde{d}^j.$$

The goal is to substitute the coefficients $\tilde{d}^j$ by new approximation coefficients $\hat{d}^j$ such that applying the inverse transform given by the operators $\tilde{H}^*$ and $\tilde{G}^*$ to the coefficients $(\tilde{s}^j, \hat{d}_j)$ yields the same coefficients as obtained from the full-frame inverse transform of $(s^j, d^j)$ using the operators $H^*$ and $G^*$, i.e.

$$\tilde{H}^* \tilde{s}^j + \tilde{G}^* \hat{d}^j = H^* s^j + G^* d^j \quad (2)$$

where $H^*$, $\tilde{H}^*$, $G^*$ and $\tilde{G}^*$ are general transform operators for single level decomposition using biorthogonal wavelet systems and $s^j$ and $d^j$ are the coefficients of the quality measure $I_q$ at scale j. The later condition implies that the coefficients $s^j$ and $d^j$ coincide with $\tilde{s}^j$ and $\tilde{d}^j$, respectively, except at those positions that were affected by the boundary corrections of the forward tile transform. At these positions, the coefficients $d^j$ are zero. If the analysis filter is of length two (e.g., for the 2-10 filter), then $\tilde{s}^j = s^j$ and $\tilde{G}^* = G^*$. In that case the solution of Eq. (2) consist of solving the equation $\tilde{G}^* \hat{d}^j = G^* d^j$. For an analysis filter of length greater than two, the calculation of approximations of solutions for Eq.(2) consists of two steps. First, approximations $\bar{s}^j = s^j$ are generated such that $H^* \bar{s}^j \approx H^* s^j$ and then solutions of $\tilde{G}^* \hat{d}^j = G^* d^j$ are computed.

One approach is to compute approximations of the actual coefficients $s^J$ by computing the complete inverse and the full-frame forward transform. For lossless compression, this approach yields the exact coefficients $s^j$, whereas for lossy compression only approximations would be obtained. But this approach may not be useful for a fast decoder. Therefore, the goal is to find approximations $\bar{s}^j$ such that $$H^* \bar{s}^j = H^* s^j.$$

One embodiment of the procedure for finding the coefficients $\bar{s}^j$ is illustrated with the example of a three-tap lowpass analysis filter. FIG. 1 shows a schematic overview of the lowpass coefficients calculated with the transform on tiles. Most of the coefficients are the same as those that result from application of transform to the full frame, but some in the neighborhood of the tile boundary differ, such as differing coefficients 101. Due to the downsampling step in the forward transform, the coefficients $s^j$ and $d^j$ are a subset of the set of coefficients of the overcomplete wavelet transform $s_m^j$ and $d_m^j$ where m is an integer index. In terms of the overcomplete transform coefficients, the equation (1) above changes to $$s_{2^j m}^j = H s_{2^{j-1} m}^{j-1} \text{ and } d_{2^j m}^j = G s_{2^{j-1} m}^{j-1}$$

Using this notation, the coefficients $s_{2^j m + 2^{j-1}}$ and $d_{2^j m + 2^{j-1}}$ can be computed by applying the transform operators H and G to the coefficients $s_{2^{j-1}(m+1)}^{j-1}$ and $d_{2^{j-1}(m+1)}^{j-1}$, which are shifted sequences of the original coefficients. If the coefficients $s_{2^j m + 2^{j-1}}^j$ and $d_{2^j m + 2^{j-1}}$ are available, one step of the inverse transform also yields the set of coefficients $s^{j-1}$.

Figure 1B:
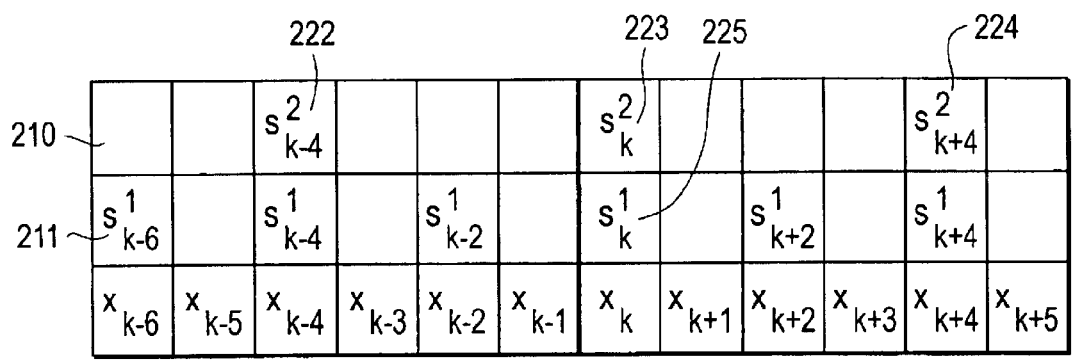
FIG. 1B illustrates a forward transform operation for full-frame (without tiling) DWT obtaining scaling coefficients.

The forward transform step for obtaining scaling coefficients $s_{2^j m}^j$ for a classical DWT is shown in FIG. 1B. Referring to FIG. 1B, the application of an inverse transform to the level 2 s coefficients in row 210 produces the level 1 s coefficients in row 211. For example, applying the inverse transform to s coefficient 222–224 and corresponding d coefficients generates s coefficient 225. The number of coefficients of a higher level of decomposition needed to generate one value in the next lower level of decomposition depends on the length of the filter and may depend on the level of decomposition.

Figure 1C:
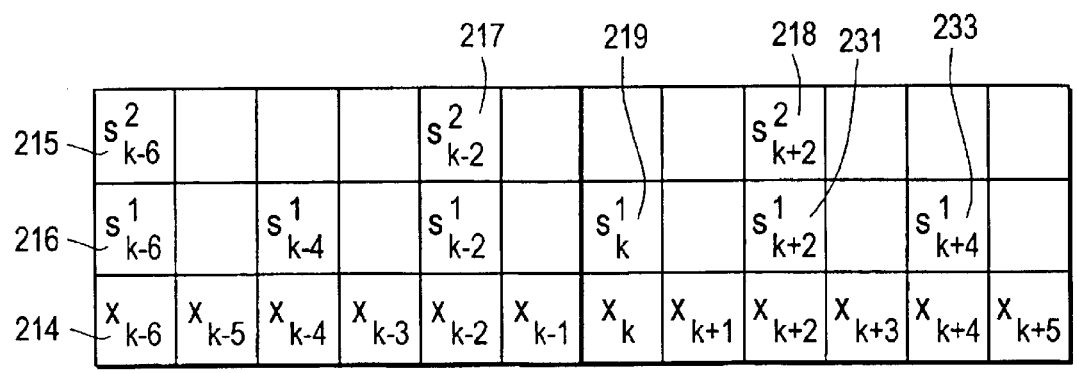
FIG. 1C illustrates a forward transform operation for obtaining scaling coefficients of a shifted full-frame DWT.

The detiling solution uses knowledge from overcomplete wavelet transforms that computes shifts of the wavelet transform. The forward transform step for obtaining scaling coefficients $s_{2^j m + 2^{j-1}}$ of a shifted DWT is shown in FIG. 1C. Referring to FIG. 1C, the application of a forward transform to the level 1 s coefficients in row 216 produces the level 2 s coefficients in row 215. For example, applying the forward transform to s coefficients 219, 231, 233 and generates s coefficient 218 and the corresponding d coefficient (not shown).

Using a full-frame transform with biorthogonal wavelet systems, in order to obtain perfect reconstruction at scale J=2, only the coefficients $s_{k-4m}^2$ have to be stored or fed into the computation of the decomposition at the next level. However, the coefficients $s_{k-(4m-2)}^2$ can be computed from the stored information by applying one step of the inverse transform and one step of the shifted forward transform. Applied to coefficients of the quality measure at scale 2, this procedure gives the in-between coefficients $s_{k-(4m-2)}^2$.

Furthermore, instead of using the coefficients $s_{k-4m}{}^2$, the coefficients $s_{k-(4m-2)}{}^2$ can also be used in the reconstruction of the quality of measure to obtain the coefficients $s_{k-2m}{}^1$. Using these additional coefficients in the reconstruction, smoother approximations are obtained. The technique described herein uses these ideas to "smooth across tiles." The approximation coefficients $\bar{s}^j$ are computed in a series of steps and starts with lowpass and highpass coefficients at the largest scale, i.e., scale 2 in this example.

Figure 2:
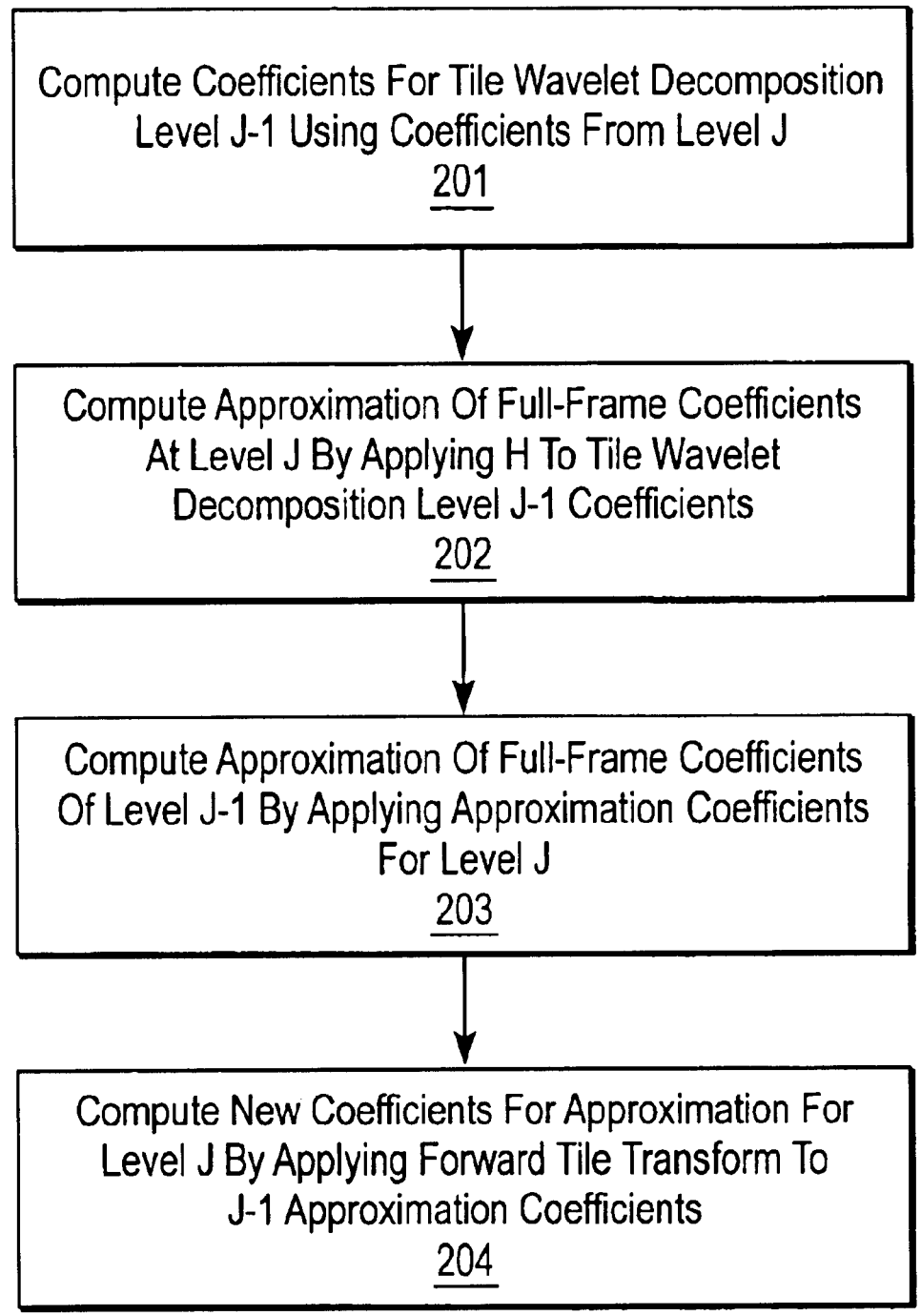
FIG. 2 illustrates one embodiment of a process for smoothing boundaries across tiles.

FIG. 2 illustrates the process of smoothing boundaries across tiles. The process is performed with processing logic that may comprise hardware, software or a combination of both.

Referring to FIG. 2, the process begins with processing logic computing the coefficients $\tilde{s}^{j-1}$ by applying one step of the inverse tile transform to the coefficients $\bar{s}^j$ and $\bar{d}^j$ (processing block 201). Next, processing logic computes an approximation $\bar{s}_{k\pm2}{}^j$ of the full-frame coefficients $s_{k\pm2}{}^j$ by applying the transform operator H to the $\tilde{s}^{j-1}$ coefficients (processing logic 202). Then, processing logic computes an approximation $\bar{s}_k{}^{j-1}$ of $s_k{}^{j-1}$ by applying the inverse transform operator $H^*$ to the $\bar{s}_{k-(4m-2)}{}^j$ coefficients (processing logic 203). Finally, processing logic computes new coefficients $\bar{s}_k{}^j$ and $\bar{d}^j$ by applying the forwards tile transform to the $\bar{s}_k{}^{j-1}$ coefficients.

The four steps explained above are illustrated in detail in the following schematic overview in conjunction with FIGS. 3A–3E, with the result being the generation of approximations for coefficients, such as approximations for differing coefficients 101 of FIG. 1.

Referring to FIG. 3A, the process starts with level 2 scaling (s) and wavelet (d) coefficients. Processing logic applies an inverse tile transform to the level 2 coefficients, thereby using smooth scaling and detail wavelet coefficients to create level 1 scaling coefficients. The result of the inverse transform are the scaling coefficients in level 1 shown in FIG. 3B. At this point, the wavelet (d) coefficients are no longer used.

Then processing logic applies a forward transform to the level 1 coefficients to compute level 2 scaling coefficients $\bar{s}_{k-2}{}^2$ (301) and $\bar{s}_{k+2}{}^2$ (302). This is shown in FIG. 3C.

Figures 3D, 3E:
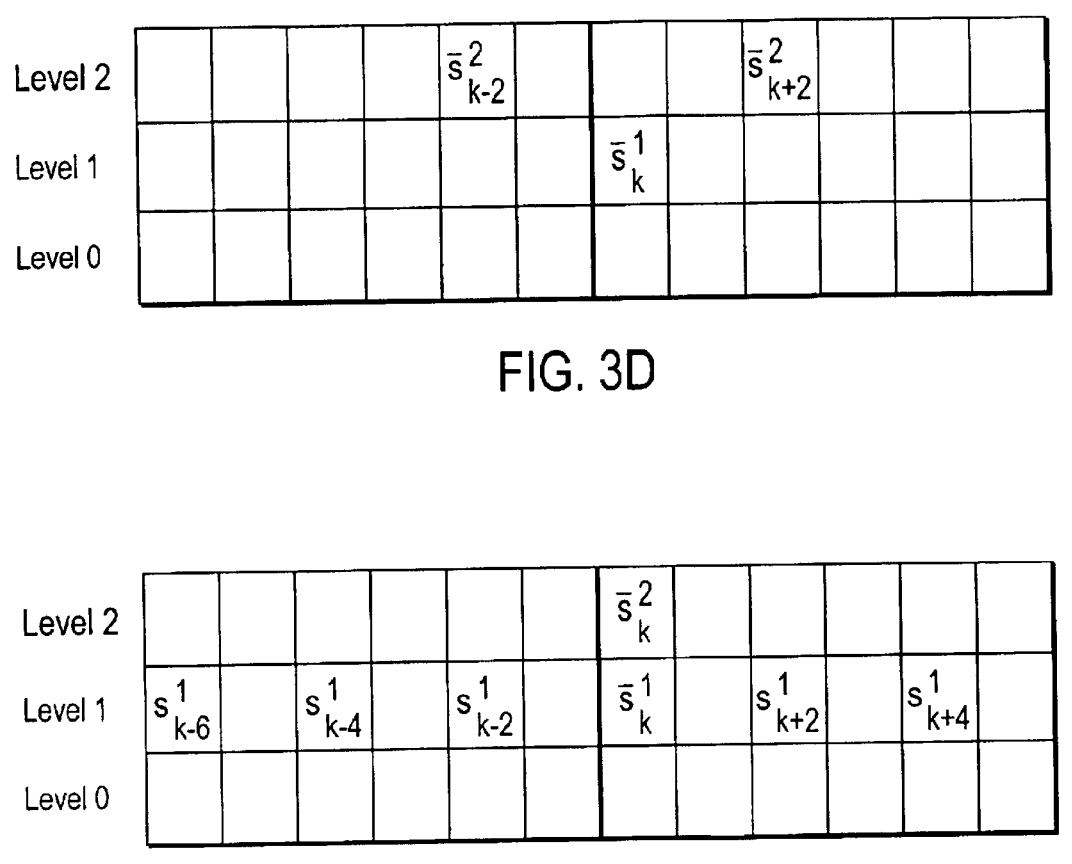

Processing logic then applies an inverse transform to the shifted scaling coefficients $\bar{s}_{k-2}{}^2$ and $\bar{s}_{k+2}{}^2$ to compute $\bar{s}_k{}^1$, as shown in FIG. 3D.

The actual smooth reconstruction is finished at this point. However, if it is desired to have modified coefficients as an input data set for one complete step of the inverse tile transform, then processing logic applies a forward tile transform to the scaling coefficients, including the scaling coefficient $\bar{s}_k{}^1$ to compute scaling coefficients $\bar{s}_k{}^2$ and detail coefficients $\bar{d}_k{}^2$.

Figure 4:
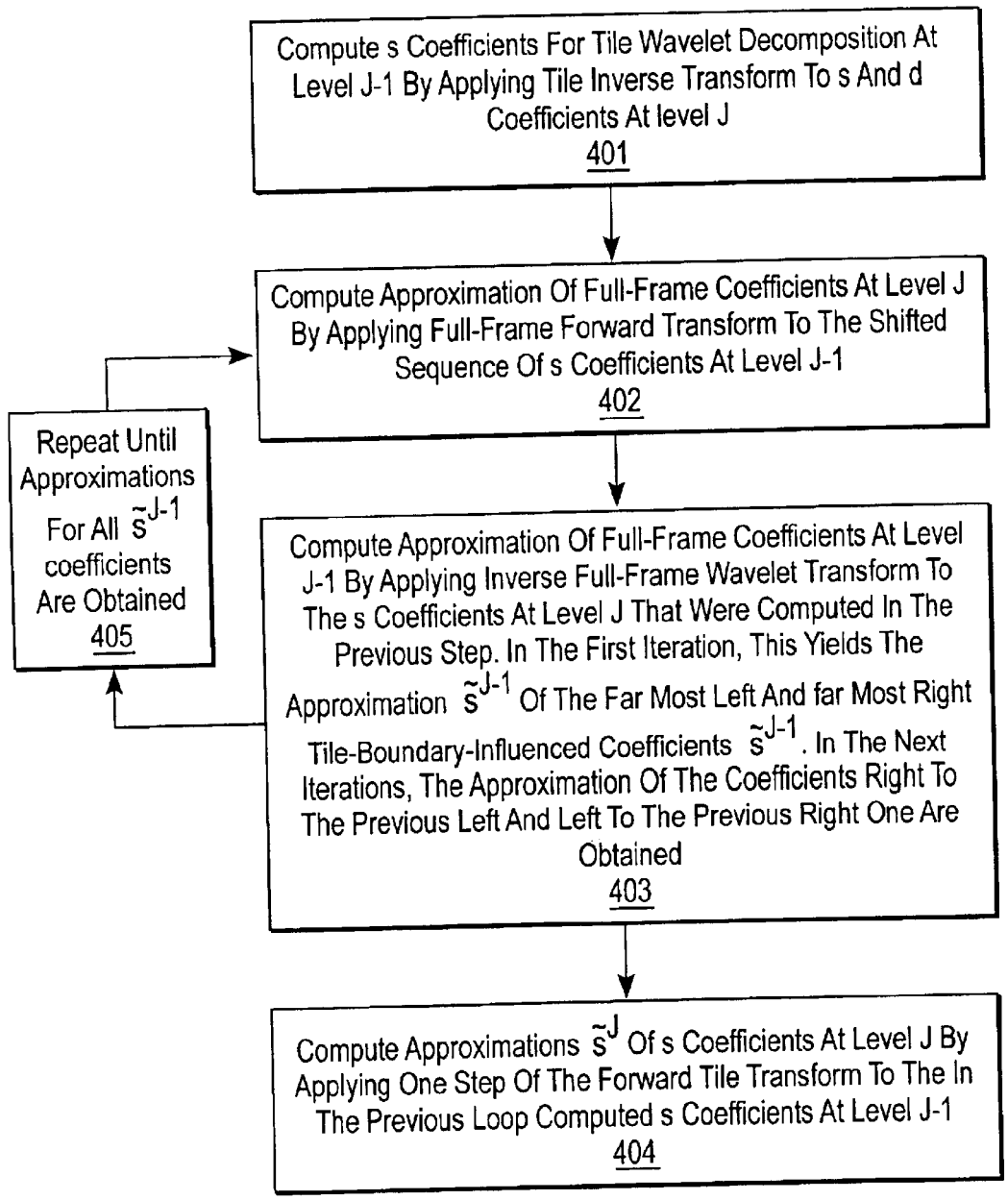
FIG. 4 is a flow diagram of an alternative embodiment of a process or smoothing boundaries across tiles.

FIG. 4 is a flow diagram of one embodiment of a process for removing tile boundary coefficients. The processing is performed by processing logic that may comprise hardware, software, or a combination of both. Referring to FIG. 4, processing logic computes s coefficients for the tile wavelet decomposition at level J−1 by applying a tile inverse transform to s and d coefficients at level J (processing block 401). Then processing logic computes an approximation of the full-frame coefficients at level J by applying a full-frame forward transform to the shifted sequence of s coefficients at level J−1 (processing block 402). The result of the computation is an alternative phase of the s coefficients at level J.

Afterwards, processing logic computes an approximation of the full-frame coefficients at level J−1 by applying an inverse full-frame wavelet transform to the s coefficients at level J that were computed at processing block 402 (processing block 403). In the first iteration, this yields the approximation $\tilde{s}^{J-1}$ of the far most left and far most right tile-boundary-influenced coefficients $\tilde{s}^{J-1}$. In the next iterations, the approximation of the coefficients right to the previous left and left to the previous right one are obtained.

Processing logic tests whether all $\tilde{s}^{J-1}$ coefficients have been obtained and repeats processing blocks 402 and 403 until approximations for all $\tilde{s}^{J-1}$ coefficients are obtained (processing block 405).

Thereafter, processing logic computes approximations $\bar{s}^J$ of s coefficients at level J by applying one step of the forward tile transform to the s coefficients at level J−1 computed above (processing block 404). This procedure can be implemented as a simple filter operation as described below in more detail.

The process may be implemented in software. Below is the pseudo code for one embodiment of a compression/decompression system without detiling.

```
for tile 1 to T
    compute DWT on tile for all levels
    quantize, compress coefficients
end
for tile 1 to T
    decompress, inverse quantize coefficients
    compute inverse DWT on tile
end
```

Below is the pseudo code for two embodiments of a compression/decompression system with detiling.

```
for tile 1 to T
    compute tile DWT
    quantize, compress coefficients
end
for level J to 1
    for tile 1 to T
        decompress, inverse quantize coefficients
        compute tile inverse transform
        for iteration 1 to M
            shift lowpass coefficients by one position toward tile
                boundary at level J−1
            compute forward DWT at tile boundary using only
                lowpass coefficients
            compute inverse DWT at tile boundary using only
                lowpass coefficients
        end
        clip to actual quantization
    end
end //The process ends at scale J−1.)
or;
for level J to 1
    for tile 1 to T
        decompress, inverse quantize coefficients
        compute inverse tile transform
        for iteration 1 to M
            shift lowpass coefficients by one position toward tile
                boundary
            compute forward DWT at tile boundary using only
                lowpass coefficients
            compute inverse DWT at tile boundary using only
                lowpass coefficients
        end
    end
    compute forward tile DWT
    clip to actual quantization—optional operations
    compute inverse tile DWT—optional operations
end
```

M is the number of coefficients in the neighborhood of a tile boundary that differ from the correct coefficients.

An example implementation using Matlab code is given below.

```
function [sc,s,sinv,wc,w,L] = tilecorrectcirc(s,w,p,L,hr,gr);
%                  Detiling for 3–9 wavelet system and scale L=2.
In this case only one coefficient
%           at scale L=1 has to be corrected.
% Example:   x=wnoise(4,8); L=2; p=64;
%            [f1,g1,f2,g2]=wfilters('bior2.4');
%            [s,w,p,L,option]=tiledwtcirc(x,f2,g2,p,L);
%
     [sc,s,sinv,wc,w,L]=tilecorrectcirc(s,w,p,L,f1,g1);
%              subplot(3,1,1); plot(sc); % smoothed version;
%              subplot(3,1,2); plot(ttts); % nonsmoothed version;
%        subplot(3,1,3); plot(ttts-sc);
%
a = [0.0331 −0.0663 −0.1768 0.4198 0.9944]; % filter coefficients for inverse lowpass
b = [0.3536 0.7071 0.3536];  % filter coefficients for forward lowpass
origsize = floor(length(s) * (2 ^L));
mt = origsize/p
tsize = length(s)/mt;
wc = w;
s1 = s;
wsize = length(w);
sc = s;
tw = w(wsize−length(s)+1:wsize);
size(tw)
ttw = zeros(size(tw));
size(ttw)
[ts,pp,1] = tileidwtcirc(tw,s,hr,gr,p/2,1);
sinv = ts;
size(ts);
s1=ts;
sc = s1;
for i = 1:mt−1
    sindex = i*2*tsize + 1;
    spart1 = b(1)*s1(sindex−4) + b(2)*s1(sindex−3)+b(1)*s1(sindex−2)
    spart2 = b(1)*s1(sindex−2) + b(2)*s1(sindex−1)+b(1)*s1(sindex)
    spart3 = b(1)*s1(sindex) + b(2)*s1(sindex+1)+b(1)*s1(sindex+2)
    spart4 = b(1)*s1(sindex+2) + b(2)*s1(sindex+3)+b(1)*s1(sindex+4)
       sc(i*2*tsize+1) =
       a(2)*spart1+a(4)*spart2+a(4)*spart3+a(2)*spart4;
end;
clear ts
ts = zeros(1,mt*tsize);
for i=1:mt
    ts(i*tsize) = sc((i−1)*tsize+1);
    ts((i−1)*tsize+1:i*tsize−1) = sc((i−1)*tsize+2:i*tsize);
end
```

```
function [s,w,p,L] = tiledwtcirc(x,hd,gd,p,L);
m = length(x);
mt = floor(m/p)
wsize = m−m/(2 ^L);
w = zeros(1,wsize);
s1 = x;
index = 1;
tsize = p/2;
for j = 1:L
    for i = 0:mt−1
        tsize = floor(p/(2^j));
        clear ts tw;
        [ts,tw] = dwtper(s1(2*tsize*i+1:2*tsize*(i+1)),hd,gd);
        w(index:index−1+tsize) = tw;
        s1((i)*tsize+1) = ts(length(ts));
        s1((i)*tsize+2:(i+1)*tsize) = ts(1:tsize−1);
        index = index + tsize;
    end;
    s1(mt*tsize+1:m) = 0;
```

```
    end;
    s = zeros(1,mt*tsize);
    s = s1(1:mt*tsize);
```

```
function [xinv,p,L,s2] = tileidwtcirc(w,s,hr,gr,p,L);
n = length(s)+length(w)
mt = floor(n/p);
wsize = length(w);
tx = zeros(1,p+L*4);
xinv = zeros(1,n);
index = wsize;
s1 = zeros(1,n)
tsize = length(s)/mt;
ts = zeros(1,n)
ts(1:length(s)) = s;
for j = 1:L
    tsize = p/(2^(L+1−j));
    for i = 1:mt
        s1(i*tsize) = ts((i−1)*tsize+1);
        s1((i−1)*tsize+1:i*tsize−1) = ts((i−1)*tsize+2:i*tsize);
    end;
    tw = w(index−mt*tsize+1:index);
    for i = 0:mt−1
        tx =
idwtper(s1(i*tsize+1:(i+1)*tsize),tw(i*tsize+1:(i+1)*tsize),hr,gr);
        xinv(i*2*tsize+1:(i+1)*2*tsize) = tx;
    end;
    index = index − mt*tsize;
    s1(1:mt*2*tsize) = xinv(1:mt*2*tsize);
    ts(1:mt*2*tsize) = s1(1:mt*2*tsize);
end;
xinv = s1;
```

Copyright 1999–2000 Ricoh Silicon Valley

The detiling solution at a specific scale J can be implemented as simple filter operations on the scaling and wavelet coefficients at scale J. The number of coefficients at scale J−1 that have to be corrected as well as the filter operations depend on the given wavelet system and the scale J.

FIGS. 5A, 6, and the combination of FIGS. 7 and 8 show examples of the detiling filter coefficients for the 3-9, 5-3 and 7-9 wavelet systems, respectively. Coefficients for these wavelets are given below.

3-9 filter:
Analysis lowpass:
0.5/sqrt (2)
1.0/sqrt (2)
0.5/sqrt (2)
Analysis highpass:
(−3/64)/sqrt (2)
(−3/32)/sqrt (2)
(1/4)/sqrt (2)
(19/32)/sqrt (2)
(1/4)/sqrt (2)
(−3/32)/sqrt (2)
(−3/64)/sqrt (2)
5-3 filter:
Analysis lowpass:
−0.25/sqrt (2)
0.5/sqrt (2)
1.5/sqrt (2)
0.5/sqrt (2)
−0.25/sqrt (2)
Analysis highpass:
0.5/sqrt (2)
−1.0/sqrt (2)
0.5/sqrt (2)

Daub9-7:
Analysis lowpass:
0.03782846
−002384946
−0.11062440
0.37740285
0.85269868
0.37740285
−0.11062440
−0.02384946
0.03782846
Analysis highpass:
0.06543888
−0.04068942
−0.41809227
0.78848562
−0.41809227
−0.04068942
0.06453888

The filters are normalized such that the coefficients of each lowpass 30 filter sum up to $1/\sqrt{2}$. Columns show the vector of coefficients that have been downsampled and that have to be convolved with the scaling or wavelet coefficients at scale J in order to compute the smooth approximation of the scaling coefficients at scale J−1 at the position indicated in the title of the column. The position "index" marks the first position to the right of the tile boundary and corresponds to "k" in the example. The indices denoted by "left ..." and "right ..." denote the coefficients from boundary extensions that are necessary for the first inverse tile transform step. Thus, the steps depicted in FIGS. 2 and 3 may be reduced to the single step of applying a pre-computed filter.

The operation of these filters may be explained as follows. In the following, assuming the detiling filter for s-coefficients is f[s] and the detiling filters for d-coefficients is f[d], then the detiling solution for $\tilde{s}_{index}^{1}$ is as follows:

$$<s^{(2)}, f[s]> + <d^{(2)}, f[d]> = \tilde{s}_{index}^{1}$$

where <a,b> means vector inner product of a and b.

For the 3-9 wavelet system or 5-3 filter shown in FIG. 5A, $$\tilde{s}_{index}^{1} = \sum_{m=-4}^{-1} (s_{index+m} \cdot f[s]_m + d_{index+m} \cdot f[d]_m) +$$

$$\sum_{m=0}^{1} (s_{left+m} \cdot f[s]_{left} + d_{left+m} \cdot f[d]_{left}) +$$

$$\sum_{m=-1}^{0} (s_{right+m} f[s]_{right} + d_{right+m} f[d]_{right}) +$$

$$\sum_{m=0}^{4} (s_{index+m} \cdot f[s]_m + d_{index+m} \cdot f[d]_m)$$

Figures 5B, 5C:
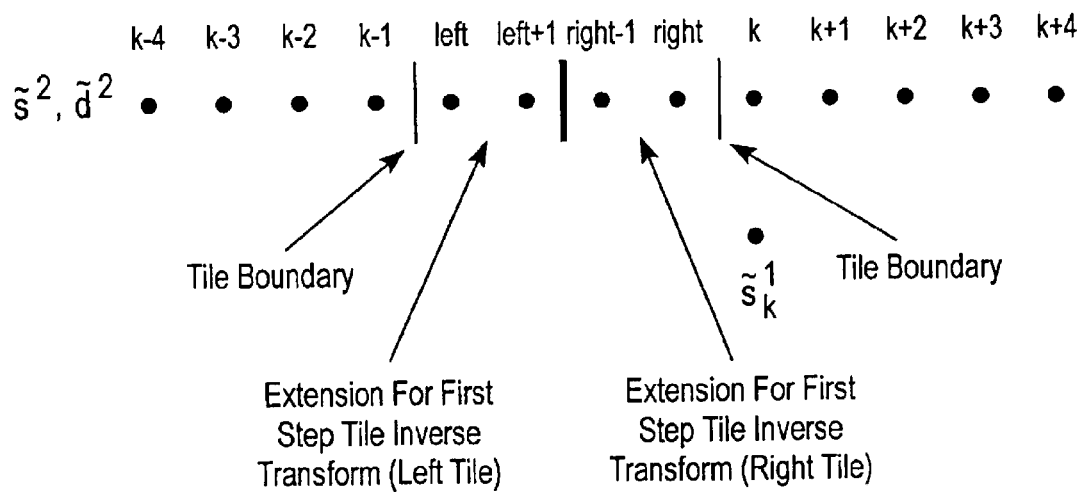
FIG. 5B is a table that shows a detiling correction value for the level 1 $s_{index}$ value along with the values of the level 1 scaling coefficients without any modification.
FIG. 5C illustrates positions where the tile boundary is shown duplicated with two circular extensions, one for each of the duplicated boundaries.

For example, referring to FIG. 5A, filter coefficients for the 3-9 wavelet system may be used to calculate the approximation coefficient $s_{index}$. The table in FIG. 5B shows actual scaling (s) coefficients, with their corresponding vector position, for a test signal at level 1. The positions are shown in FIG. 5C where the tile boundary is shown duplicated with two circular extensions, one for each of the duplicated boundaries. The circular extension is provided in region 505 of the table to accommodate non-symmetric filters. The coefficient at k is to be corrected. The banding is indicated along with the extensions for tiles on each side of the table boundary. With symmetric filters, better approximations may be obtained.

FIG. 5B shows an example of detiling for the 3-9 wavelet system applied to a test signal. The filter coefficients for scaling coefficients with positions in column 501 of FIG. 5A are multiplied by its corresponding level 2 scaling coefficients computed from applying the tile wavelet transform to the level 1 signal in column 551 of FIG. 5B. Similarly, the filter coefficients for the wavelet coefficients with positions indicated in column 503 are multiplied with corresponding level 2 wavelet coefficients computed from index from those given above. The resulting products of these multiplications are summed to generate a detiling correction value. The detiling correction value 553 is the level 1 $s_{index}$ value shown in FIG. 5B along with the values of the level 1 scaling coefficients without the approximation (column 551). As shown, the detiling correction value is clearly more in line with the other coefficients than the scaling coefficient without detiling.

FIG. 6 shows the filter coefficients for the 5-3 wavelet system. Referring to FIG. 6, the table includes multiple position index columns for each coefficient index position. This table is utilized in the same manner as the table in FIG. 5, except that two detiling connection values at the position index and the position index-1 at level 1 have to be computed. The additional positional index (position index-1) column is applied to the coefficients of the previous level (level 1) including the corrected $s_{index}$ value (generated as a result of applying the position index to the coefficients) to generate level 2 coefficients.

FIGS. 7 and 8 represent a table for the s coefficients and d coefficients, respectively for the 7-9 wavelet system. In this example, there are four position indices for each s and d coefficients to generate correction values for four different levels.

Characterization of Filters for Detiling

In one embodiment, the filters for detiling have the following characteristics. First, for detiling there is an increasing number of filters with increasing level of decomposition (where the filters have the same length). The number of filters at a given level L depends on the length of the forward lowpass filter, and the alignment of the filter in a tile:

number of filters at level L=number of lowpass coefficients at level L that differ from the full-frame lowpass coefficients at level L It is these differing coefficients that trigger the use of the filters for detiling. The more differing coefficients, the more filters that are needed.

The following are characteristics of filters for detiling where the forward lowpass filter is of odd length, the center of the filter is aligned with the odd lowpass coefficients, the detiling at level L, and the tile has size $2^M$ where M>L. If forward lowpass filter is of length N=2*2*D+1, then the number $n_{left}(L)$ of filters to correct lowpass coefficients left of tile boundary is as follows:

$$n_{left}(L) = D + \left\lfloor \frac{n_{left}(L-1)}{2} \right\rfloor, \text{ and}$$

the number of $n_{right}(L)$ of filters to correct lowpass coefficients right of tile boundary is as follows:

$$n_{right}(L) = D + \left\lfloor \frac{n_{right}(L-1)}{2} \right\rfloor$$

where $n_{left}(1)=D$ and $n_{right}(1)=D$. If forward lowpass filter is of length $N=2*(2*D+1)+1$, which applies to filters such as the 3,9 wavelet system, then the number $n_{left}(L)$ of filters to correct lowpass coefficients left of tile boundary is as follows:

$$n_{left}(D) = D + \left\lfloor \frac{n_{right}(L-1)}{2} \right\rfloor$$

where $n^{left}(1)=D$ and $n_{right}(1)=D+1$, and the number $n_{right}(L)$ of filters to correct lowpass coefficients right of tile boundary is as follows:

$$n_{right}(D) = D + \left\lfloor \frac{n_{left}(L-1)}{2} \right\rfloor$$

where $n_{left}(1)=D$ and $n_{right}(1)=D+1$.

Another characteristic of the filters for detiling in one embodiment described herein is that the coefficients of lowpass filter sum up to $1/(\sqrt{2})$ assuming the original transform lowpass filter coefficients sum up to $\sqrt{2}$ and coefficients of highpass filter sum up to 0. Non-unitary transforms may use a different normalization factor.

In one embodiment, a third characteristic of filters for detiling is that the filters for the detiling solution have a connection with full-frame decomposition. Such a connection may be shown by constructing signal x such that full-frame detail coefficients at level L are zero. Then the filter coefficients satisfy the following condition:
[tile detiling filter with boundary extension "overlapped blocks"=full-frame filter with zero padding].

The inverse transform on lowpass coefficients may be described as follows:

$$F^*(-z) \times (-z^2)$$

The inverse transform followed by shifted forward transform is represented by the following equations:

$$1/2[zF(z)F^*(z) \times (z^2) + zF(z)F^*(-z) \times (-z^2)] = A(z) \times (z)$$

The inverse, shifted forward, inverse transform is represented by the following equations $$1/2F^*(-z)[A(-z^2)] \times (z)$$

$$1/2F^*(-z)[A(-z^2)] \times (z) = T_{F_j \cdot F}(z) \times (z)$$

where $T_{F^* F}$ is a lowpass filter of the tile transform for "overlapped blocks" boundary extension, $F^*$ is the inverse lowpass filter and $F$ is the forward lowpass filter.

Lossy Coefficient Reconstruction

After performing the four steps described above, the quantization of the coefficients may be performed to make the modified detail coefficients consistent with the actual quantization. Making coefficient consistent with the quantization is not difficult, since the quantization is known.

Figure 21:
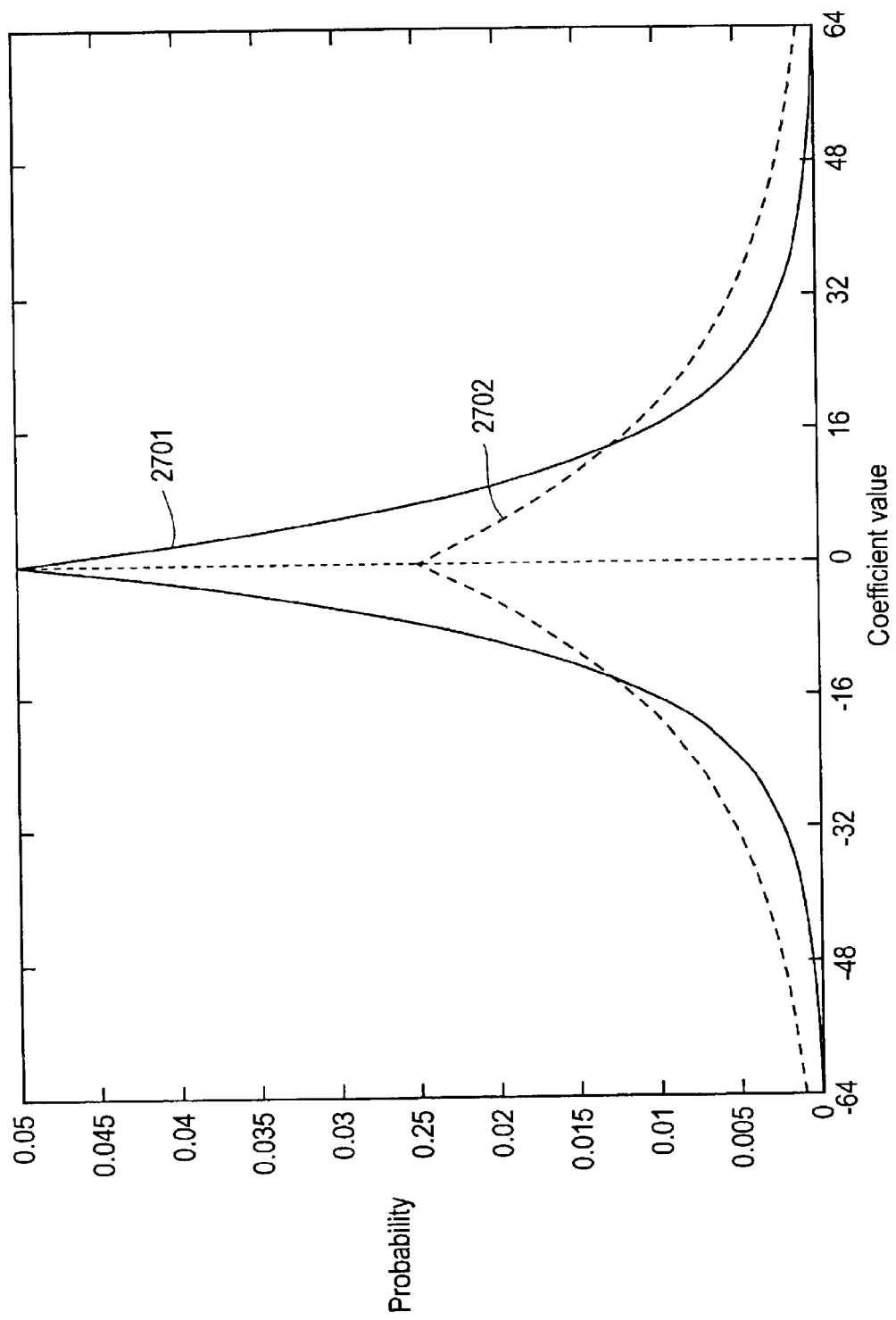
FIG. 21 illustrates a typical distributions of coefficients without quantization.

In one embodiment, lossy reconstruction is performed by truncating values to a predetermined set of integer values. For instance, in one example, all coefficients between 0 and 31 are quantized to 0, all coefficients between 32 and 63 are quantized to 32, and so on. FIG. 21 illustrates a typical distributions of coefficients without quantization. Such quantization may be performed where the bottom bits in each coefficient are not known. In another embodiment, a value in the middle of each region may provide a more accurate value to represent the group of coefficients. For instance, all coefficients between 64 and 127 are quantized to 95. The point to which the values are quantized is referred to as the reconstruction point.

Due to the difference between images, the resulting distributions might have skewed shapes. For instance, compare curves 2701 and 2702 in FIG. 21.

In one embodiment, the value is selected based on the detiling coefficient value generated. If a coefficient is quantized so its value is known to be between 64 and 127 and detiling generates a value outside this range, making the coefficient consistent with the quantization means choosing a value in the range 64 through 127. For example, generated coefficients greater than 127 could be clipped to 127 and generated coefficients less than 64 could be clipped to 64.

System Embodiments

Figure 22:
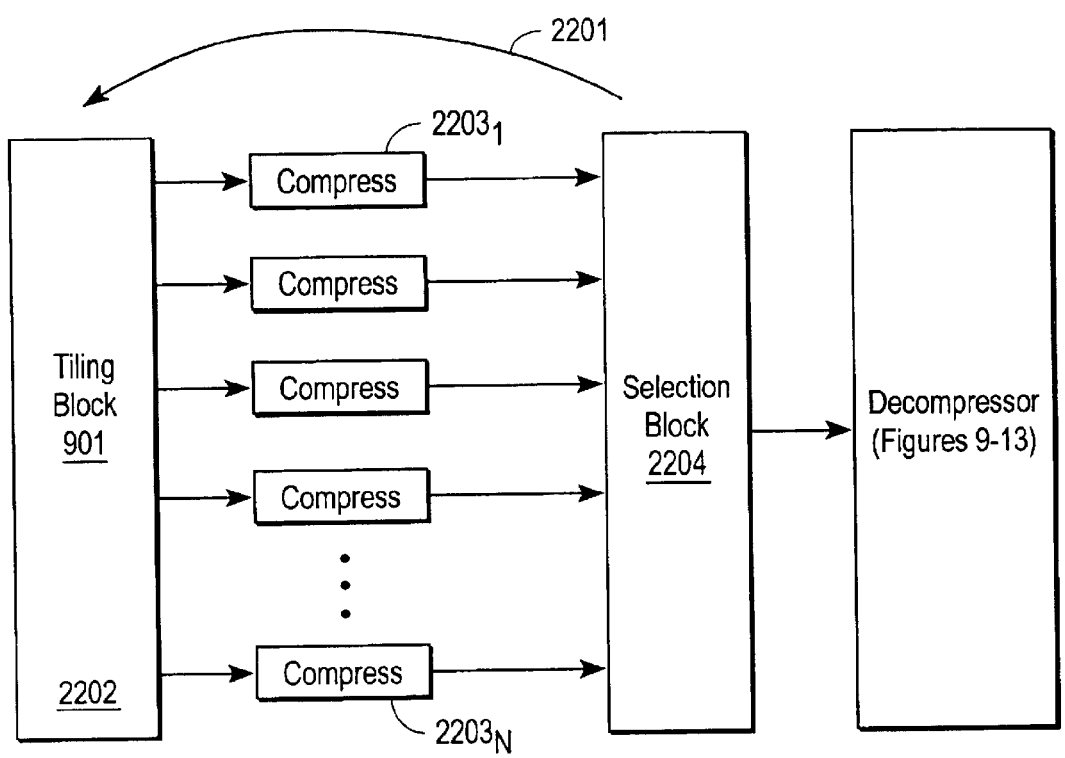
FIG. 22 illustrates a system for compressing an image and subsequently decompressing an image.

FIG. 22 illustrates a system for compressing an image and subsequently decompressing an image, or same position thereof. Referring to FIG. 22, the system comprises a compression front end 2201 having a tiling block 2202 for receiving image data and dividing it into the tiles which are individually compressed using compression blocks $2203_1 \ldots 2203_N$ here N is the total number of tiles. A selection block 2204 selects one of multiple decompression modes. Each mode may be represented as the individual systems shown in FIGS. 9–13. These include decompressing the full image without detiling, decompressing a region of interest with or without detiling and decompressing a single tile.

Figure 9:
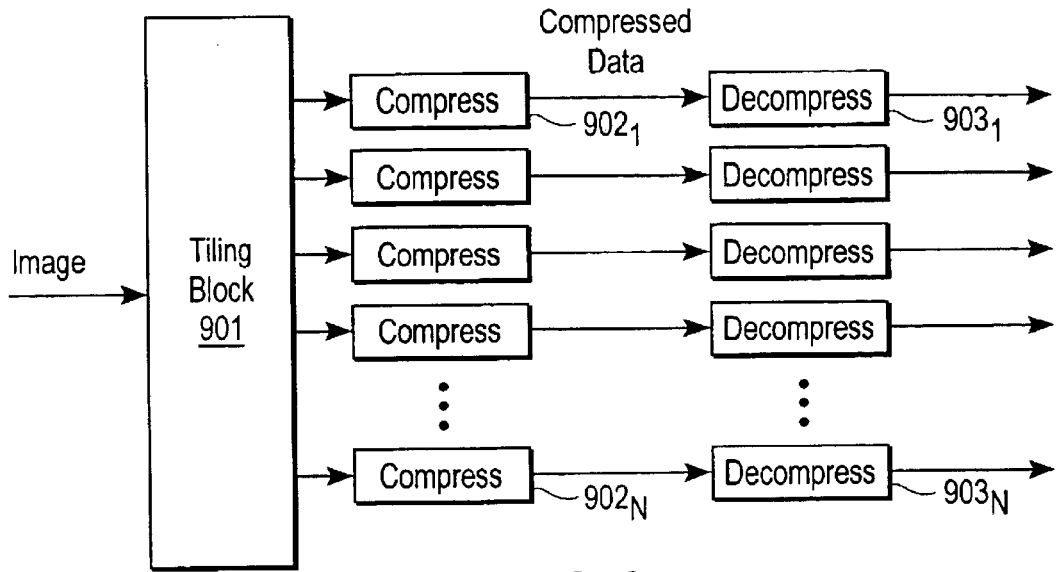
FIG. 9 illustrates one embodiment of a system for compressing an image independently on tiles and subsequently decompressing an image tile by tile.

FIG. 9 illustrates a system for compressing an image and subsequently decompressing an image. Referring to FIG. 9, the system includes a tiling block 901, a plurality of compression blocks $902_1$ to $902_N$, or compressors, and decompression block $903_1$, through $903_N$, or decompressor. The tiling block 901 receives image data and divides the image data into tiles 1-N. Each of tiles 1-N is sent to and received by one of compression blocks $902_1 \ldots 902_N$.

Compression blocks $902_1 \ldots 902_N$ compress the individual tiles independently of each other. The compressed data is forwarded to a channel and/or stored (at least temporarily). The compressed data for each of the tiles is sent to and received by decompression blocks $903_1 \ldots 903_N$. For example, the data of one tile compressed by compression block $902_1$ is sent to decompression block $903_1$. Each of decompression blocks $903_1 \ldots 903_N$ decompresses the decompressed data for its respective tile independent of the other decompression blocks.

Figure 10:
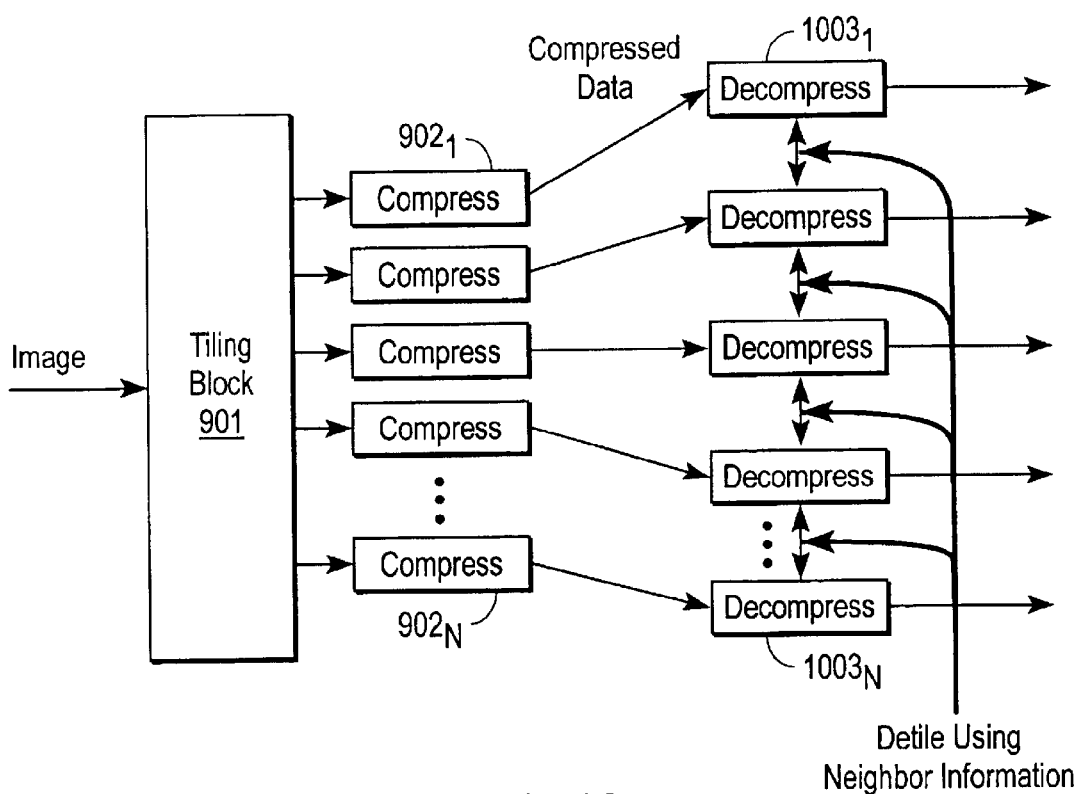
FIG. 10 illustrates one embodiment of a system for compressing an image and subsequently decompressing an image including detiling.

FIG. 10 illustrates a system for compressing an image and subsequently decompressing an image. Referring to FIG. 10, the system includes a tiling block 901, a plurality of compression blocks $902_1 \ldots 902_N$, and decompression blocks $1003_1 \ldots 1003_N$. The tiling block 901 receives image data and divides the image data into tiles 1, ..., N. Each of tiles 1, ..., N is sent to and received by one of compression blocks $902_1 \ldots 902_N$. Compression blocks $902_1 \ldots 902_N$ compress the individual tiles independently of each other. The compressed data is forwarded to a channel and/or stored (at least temporarily). The compressed data for each of the tiles is sent to and received by decompression blocks $1003_1 \ldots 1003_N$.

For example, the compressed data of tile 1 compressed by compression block $902_1$ sent to decompression block $1003_1$.

Each of decompression blocks $1003_1 \ldots 1003_N$ decompresses the decompressed data for its respective tile blocks using information from the other decompression units. In one embodiment, the information shared between the decompression units is neighboring information used to perform detiling described above. The decompressed data is then output and may be recombined into an image. Note that the recombining of tiles into images is not shown to avoid obscuring the invention. Thus, the system in FIG. 10 independently compresses tiles and decompresses the entire image using detiling. In such a case, detiling may be performed through the use of specific filter coefficients. In other words, based on the characterization of the filter detiling results. The detiling is optional and no additional cost/effort is necessary with respect to the rest of the compression/decompression operations to perform the detiling of FIG. 10.

Figure 11:
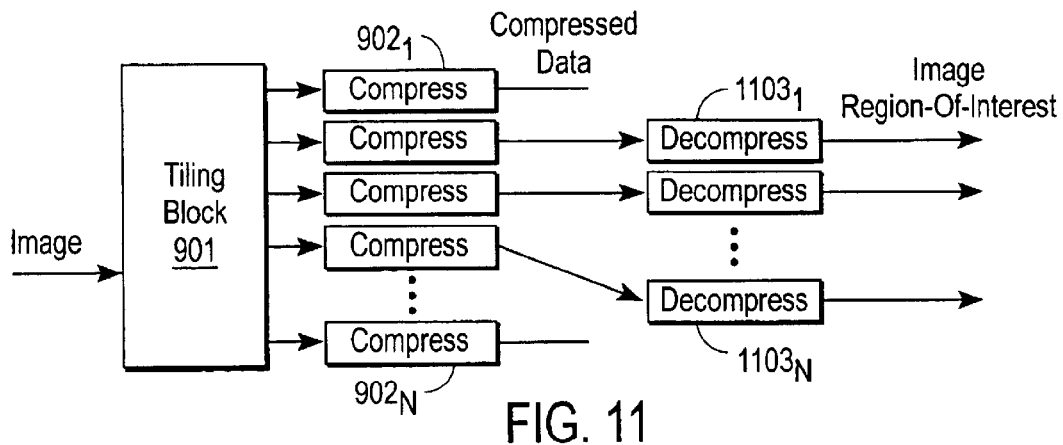
FIG. 11 illustrates one embodiment of a system for compressing an image and subsequently decompressing a region of interest of an image.

FIG. 11 illustrates a system for compressing an image and subsequently decompressing an image. Referring to FIG. 11, the system includes a tiling block 901, a plurality of compression blocks $902_1$ to $902_N$, and decompression block $1103_1$ through $1103_3$. The system in FIG. 11 operates in the same manner as FIG. 9 except decompression block $1103_{1-3}$ decompresses a region of interest in an image.

Figure 12:
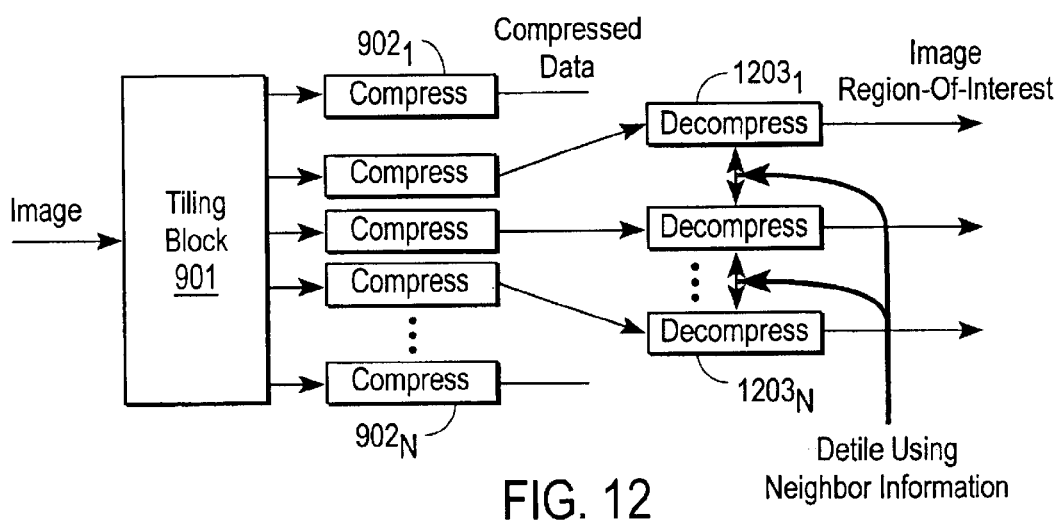
FIG. 12 illustrates one embodiment of a system for compressing an image and subsequently decompressing a region of interest of an image including detiling.

FIG. 12 illustrates a system for compressing an image and subsequently decompressing an image. Referring to FIG. 12, the system includes a tiling block 901, a plurality of compression blocks $902_1$ to $902_N$, and decompression block $1203_1$ through $1203_N$. The system in FIG. 12 operates the same as the system of FIG. 10 except decompression blocks $1203_N$ decompresses a region of interest in an image. As discussed above, there is no additional cost or effect on the rest of the compression/decompression system for performing the detiling in FIGS. 10 and 12 with detiling.

Figure 13:
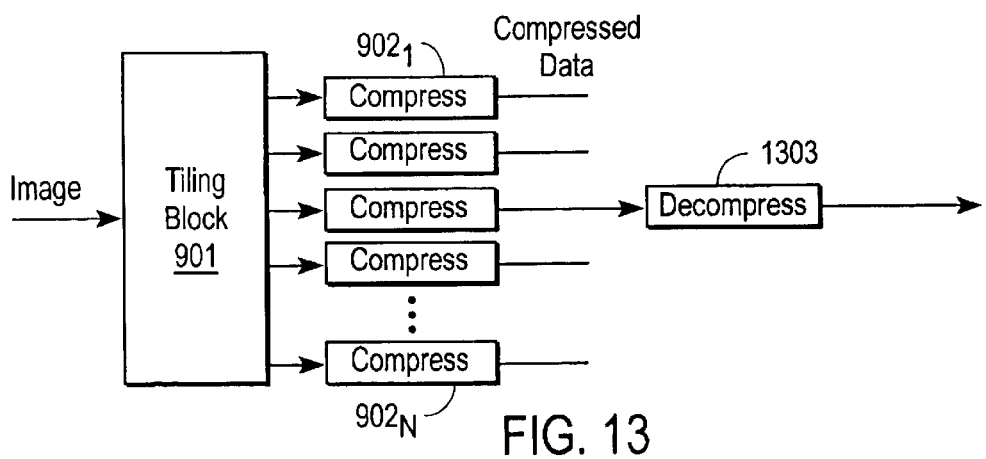
FIG. 13 illustrates a system for compressing an image and subsequently decompressing an image.

FIG. 13 illustrates a system for compressing an image and subsequently decompressing an image. Referring to FIG. 13, the system includes a tiling block 901, a plurality of compression blocks $902_1$ to $902_N$, and decompression block $1303_1$. These components operate in the same manner as the components described above. Thus, the system decompresses only a single tile independently. As discussed above, there is no additional cost or effect on the rest of the comparison/decomparison system for performing the detiling in FIGS. 10 and 12 with detiling.

Figure 14:
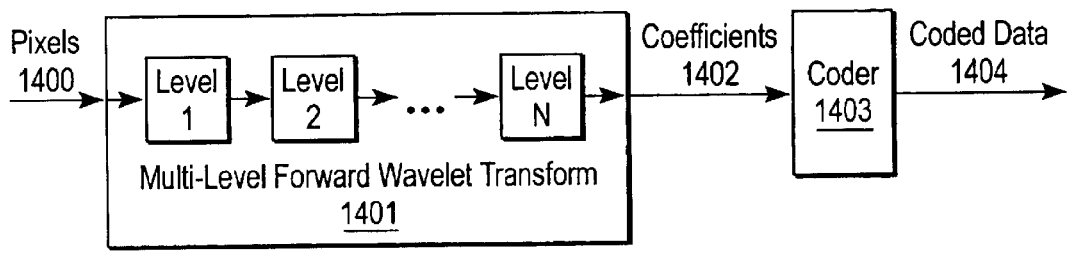
FIG. 14 illustrates one embodiment of a compression system.

FIG. 14 illustrates one embodiment of a compression system. Referring to FIG. 14, a multi-level forward wavelet transform 1401 receives pixels 1400 and generates coefficients 1402. Multi-level forward transform 1401 includes multiple levels 1, ..., N of the wavelet transform to generate the coefficients. A coder 1403 is coupled to receive the coefficients and, in response thereto, generates coded data 1404. The coder may divide coefficients into blocks, trees, or other groups.

In one embodiment, all the entropy coding is performed by binary entropy coders. In one embodiment, the entropy coder comprises either a Q-coder, a QM-coder, a MQ-coder, a finite state machine coder, or a high speed parallel coder, etc. A single coder may be used to produce a single output code stream. Alternately, multiple (physical or virtual) coders may be employed to produce multiple (physical or virtual) data streams.

In one embodiment, the binary entropy coder comprises a Q-coder. For more information on the Q-coder, see Pennebaker, W. B., et al., "An Overview of the Basic Principles of the Q-coder Adaptive Binary Arithmetic," *IBM Journal of Research and Development*, Vol. 32, pg. 717–26, 1988. In an alternate embodiment, a binary entropy coder uses a QM-coder, which is a well known and efficient binary entropy coder. The QM-coder is used in both the JPEG and JBIG standards. The MQ-coder proposed for use in both the JPEG 2000 and JBIG2 Standards may also be used.

The binary entropy coder may comprise a finite state machine (FSM) coder. In one embodiment, the finite state machine coder of the present invention comprises a B-coder defined in U.S. Pat. No. 5,272,478, entitled "Method and Apparatus for Entropy Coding," issued Dec. 21, 1993.

In one embodiment, the binary entropy coder comprises a high speed parallel coder. Both the QM-coder and the FSM coder require that one bit be encoded or decoded at a time. The high-speed parallel coder handles several bits in parallel. In one embodiment, the high speed parallel coder is implemented in VLSI hardware or multi-processor computers without sacrificing compression performance. One embodiment of a high speed parallel coder that may be used in the present invention is described in U.S. Pat. No. 5,381,145, entitled "Method and Apparatus for Parallel Decoding and Encoding of Data", issued Jan. 10, 1995.

Most efficient binary entropy coders are limited in speed by fundamental feedback loops. A possible solution is to divide the incoming data stream into multiple streams and feed these to parallel encoders. The output of the encoders are multiple streams of variable-length coded data. One problem with this type of approach is how to transmit the data on a single channel. The high speed parallel coder described in U.S. Pat. No. 5,381,145 solves this problem with a method of interleaving these coded data streams.

Many of the contexts may be fixed probability, which makes a finite state machine coder, such as the B-coder especially useful. Note when a system using probabilities close to 0.5, both high speed parallel coder disclosed above and the finite state machine coder operate with more efficiency than the Q-coder.

In another embodiment, both a binary entropy coder and a fast m-ary coder are used. The fast m-ary coder may be a Huffman coder.

Figure 15:
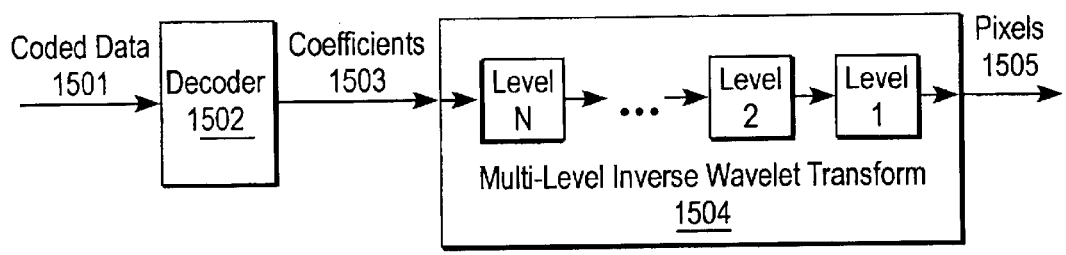
FIG. 15 illustrates one embodiment of decompression block shown in the figures above.

FIG. 15 illustrates one embodiment of decompression block shown in the figures above. Referring to FIG. 15, coded data 1501 is received and decoded by decoder 1502 which decodes the coded data 1501 into coefficient 1503. The coefficients 1503 are received by multi-level inverse transform 1504 which transforms coefficients 1503 into pixels 1505. Multi-level inverse wavelet transform 1504 includes multiple levels 1-N of an inverse wavelet transform.

Figure 16:
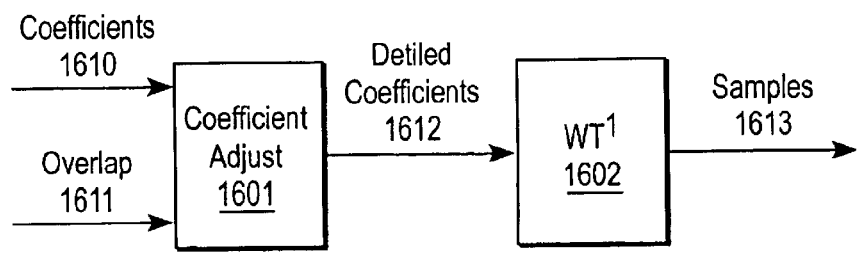
FIG. 16 illustrates one embodiment of one level of the inverse wavelet transform with detiling by correcting coefficients.

FIG. 16 illustrates one embodiment of one level of the inverse wavelet transform with detiling by correcting coefficients. Referring to FIG. 16, the inverse wavelet transform comprises a coefficient adjustment block 1601 and an inverse wavelet transform 1602. The coefficient adjustment block 1601 receives coefficients 1610 and overlap information 1611 and, in response thereto generates detiled coefficients 1612. The inverse wavelet transform 1602 receives the detiled coefficient 1612. Inverse wavelet transform 1602 may comprise a 2-D inverse wavelet transform. In response thereto, transform 1602 generates samples 1613. Samples 1613 may comprise pixels or previous level coefficients.

Figure 17:
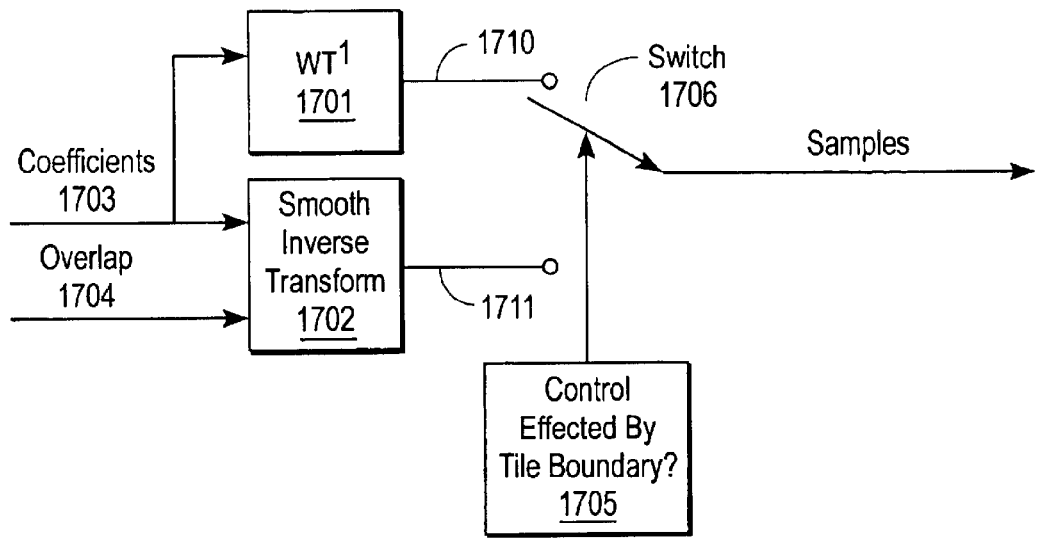
FIG. 17 illustrates an alternative embodiment of the one level of the inverse wavelet transform which performs defiling by replacing samples.

FIG. 17 illustrates an alternative embodiment of the one level of the inverse wavelet transform which performs detiling by replacing samples.

Referring to FIG. 17, transform block 1701 includes an inverse wavelet transform 1701 and a smooth inverse transform 1702. The wavelet transform 1701 receives coefficients 1703 and generates samples on its output 1710. In one embodiment, transform 1701 comprises a 2-D inverse transform. Smooth inverse transform 1702 also receives coefficients 1703 and overlap information 1704 and generates samples on its output 1711. In one embodiment, transform 1702 performs detiling using neighboring information. In an alternative embodiment, the filter coefficients used by transform 1702 create a detiling effort on bounding coefficients. Switch 1706 selects between the outputs of inverse wavelet transform 1701 and smooth inverse transform 1702 as the output samples of one of the one level of the inverse wavelet transform. Switch 1706 is controlled by control block 1705. In one embodiment, control block 1705 determines whether a particular sample is affected by tile boundary. If the particular sample is not affected by tile boundary, control block 1705 causes switch 1706 to select the samples from inverse wavelet transform 1701 but appear on output 1710. On the other hand, if control block 1705 determines that the samples are effected by a tile boundary. Control block 1705 causes switch 1706 to select samples output from the smooth inverse transform 1702 but appear on output 1711. The samples may comprise pixels or previous level coefficients.

Figure 18:
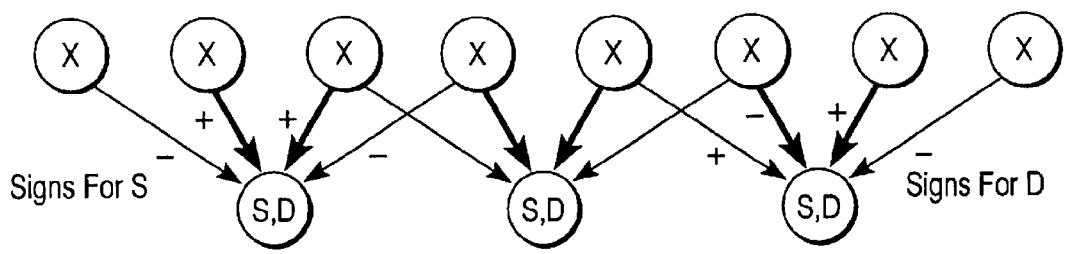
FIG. 18 illustrate one embodiment of a forward 4,4 transform.
Figure 19:
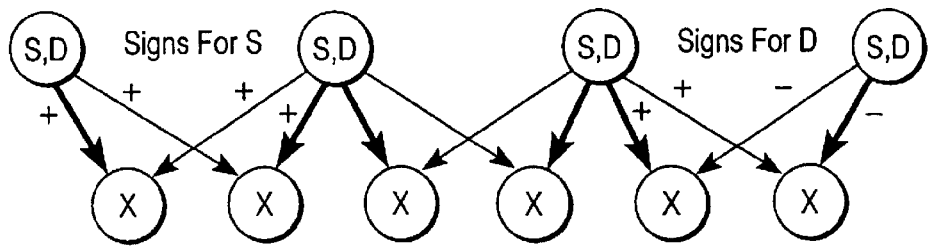
FIG. 19 illustrates one embodiment of the inverse 4,4 transform.

FIG. 18 illustrate one embodiment of a forward Le Gall-Tabatabi 4,4 transform. FIG. 19 illustrates one embodiment of the inverse 4,4 transform. Ignoring normalization factors for preserving energy and letting N be an index where N is 0,2,4,6, . . .

The smooth $S_n$ and detail $D_n$ coefficients, as well as the inputs $X_n$, may be expressed in terms of the following equations.

$$Sn = -X_{2n-1} + 3X_{2n} + 3X_{2n+1} - X_{2n+2}$$

$$Dn = X_{2n-1} - 3X_{2n} + 3X_{2n+1} - X_{2n+2}$$

$$X_{2n} = (1/16)((S_{n-1} + D_{n-1}) + 3(S_n - D_n))$$

$$X_{2n+1} = (1/16)(3(S_n + D_n) + (S_{n+1} - D_{n+1}))$$

Referring to FIGS. 18 and 19, the heavy lines indicate multiplication by 3 while the light lines indicate multiplication by 1; the signs (+ or −) depend on D or S coefficients.

The generation of the transform may be illustrated with an example.

Assume a tiled signal x is Tiled X:0 . . . 0|100 . . . 100, where "|" is a boundary and 0,100 are pixel values (chosen arbitrarily), then applying the forward transform results in Tiled S:0 . . . 0|400 . . . 400, and Tiled D:0 . . . 0|0 . . . 0

Full frame coefficients are:

Full frame S:0 . . . 0 −100|500 400 . . . 400

(Full frame D:0 . . . 0 −100|−100 0 . . . 0)

Applying the inverse transform to full frame S results in the following:

$$0 \ldots 0 \ \frac{-100}{16} \ \frac{-300}{16} \ \frac{200}{16} \Big| \frac{1400}{16} \ \frac{1900}{16} \ \frac{1700}{16} \ \frac{1600}{16} \ \ldots \ \frac{1600}{16}$$

This reconstruction has "ringing," it is "peaky" around the tile boundary.

If the other phase is used:

Other phase full frame S:0 . . . 0 200|400 . . . 400

(Other phase full frame D:0 . . . 00|0 . . . 0)

Then applying the inverse transform on the other phase results in the full frame $$S{:}0 \ \ldots \ 0 \ \frac{200}{16} \ \frac{600}{16} \Big| \frac{1000}{16} \ \frac{1400}{16} \ \frac{1600}{16} \ \ldots \ \frac{1600}{16}$$

This reconstruction is smooth at the boundary.

Figure 20A:
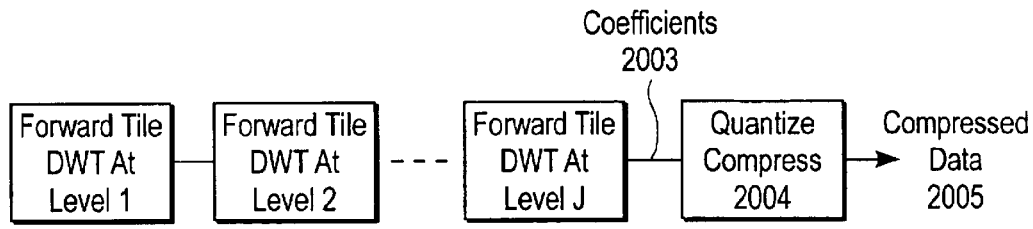
FIGS. 20A, 20B, 20C and 20D illustrate the forward and inverse transform with detiling.

FIGS. 20A, 20B, 20C and 20D illustrate the forward and inverse transform with detiling. Referring to FIG. 20A, a forward tile transform is shown with multiple levels. Referring to FIG. 20A, the forward transform comprises forward tile discrete wavelet transform (DWT) at level one through forward tile DWT at level J. The output of forward tile DWT at level J are a set of coefficients which are a set of coefficients 2003. Quantization and compression block 2004 receives coefficients 2003 and, in response thereto, quantizes and compresses the coefficients into compressed data 2005.

Figure 20B:
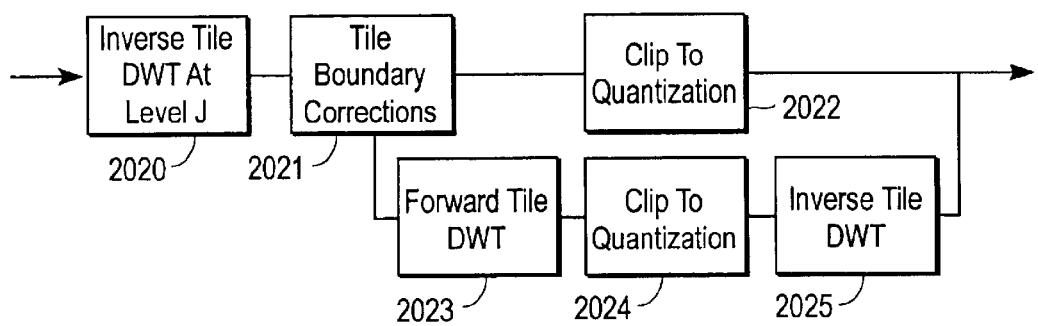
Figure 20C:
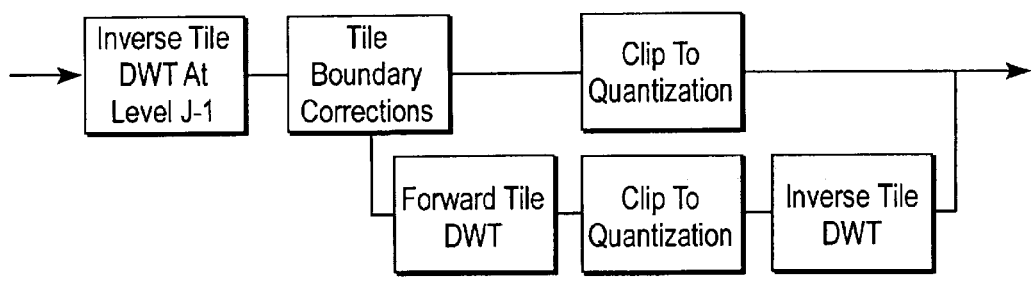
Figure 20D:
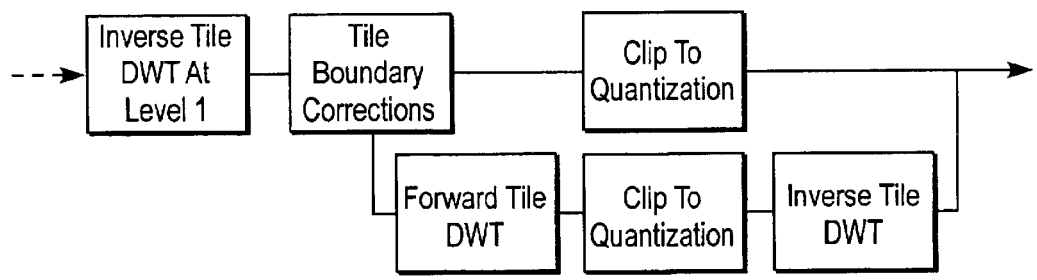

FIGS. 20B, 20C and 20D illustrate different levels of the inverse tile DWT. Note that although three are shown, there is a corresponding inverse tile DWT for each of the levels. Only one of the levels will be explained as they are identical.

Inverse tile DWT 2020 performs inverse transform on the coefficients. The output of inverse tile DWT 2020 comprises a set of samples. The samples undergo tile boundary correction by corrections block 2021. Those samples that are not at a boundary are forwarded unchanged to quantization block 2022 which performs a clipping operation to quantize the samples. The quantized samples are then output as an output of the inverse tile transform. Those samples that occur at a boundary are forwarded on to forward tile DWT 2023 which performs a forward tile transform on the samples to generate a set of coefficients. The coefficients are received by quantization block 2024 which performs quantization operations on the coefficients. In one embodiment, the quantization operation is the clipping operation. The quantized coefficients are then forwarded to an inverse tile block 2025 which perform an inverse tile DWT on the coefficients to generate samples which are then output as an output of the inverse tile transform.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a compression/decompression system and method have been described.

We claim:

1. A method for processing data, the method comprising:
    decompressing a plurality of sets of compressed data, including performing detiling on a first set of compressed data using neighbor information from at least one other set of compressed data by modifying tile highpass and lowpass coefficients at a decomposition level using neighboring highpass and lowpass coefficients at the decomposition level; and
    recombining the plurality of decompressed tiles into an image.

2. The method defined in claim 1 further comprising:
    dividing image data into a plurality of tiles; and
    compressing the plurality of tiles individually to create the plurality of sets of compressed data.

3. A method for processing data, the method comprising:
    decompressing a plurality of sets of compressed data, including performing detiling on a first set of compressed data using neighbor information from at least one other set of compressed data, wherein performing detiling comprises:
(a) computing one level inverse tile transform on tile transform $s^J$ and $d^J$ coefficients to generate $s^{J-1}$ coefficients;
(b) apply a shifted forward transform to the $s^{J-1}$ coefficients to generate $\bar{s}^J$ which are approximations of the $s^J$ coefficients;
(c) performing a one level inverse transform using the $\bar{s}^J$ approximation coefficients where the d coefficients have been set to zero to generate $\bar{s}^{J-1}$ coefficients, which are approximations to the $s^{J-1}$ coefficients; and
(d) iteratively performing (b) and (c); and
recombining the plurality of decompressed tiles into an image.

4. The method defined in claim 3 further comprising:
computing the forward DWT at the tile boundary using only lowpass coefficients; and
computing the inverse DWT at the tile boundary using only lowpass coefficients.

5. The method defined in claim 4 further comprising making samples consistent with quantization after decompression.

6. A method for processing data, the method comprising:
decompressing a plurality of sets of compressed data, including performing detiling on a first set of compressed data using neighbor information from at least one other set of compressed data, wherein performing detiling comprises:
computing the inverse discrete wavelet transform (DWT) on a tile;
iteratively performing the following
computing lowpass coefficients shifted by one position near a tile boundary,
computing the forward DWT at the tile boundary using only lowpass coefficients, and
computing the inverse DWT at the tile boundary using only lowpass coefficients;
computing the forward tile DWT;
making coefficients generated by performing the forward tile DWT consistent with quantization; and
computing an inverse tile DWT; and
recombining the plurality of decompressed tiles into an image.

7. The method defined in claim 6 wherein computing the forward and inverse tile DWT occurs iteratively.

8. The method defined in claim 7 wherein the number of iterations depends on filter length and level of decomposition.

9. The method defined in claim 7 wherein the number of iterations depends on the number of s coefficients affected by the boundary.

10. An apparatus for processing data, the method comprising:
means for decompressing a plurality of sets of compressed data, the means for decompressing the plurality of sets of compressed data including means for performing detiling on a first set of compressed data using neighbor information from at least one other set of compressed data, wherein the means for performing detiling comprises means for modifying tile highpass coefficients at a decomposition level using neighboring lowpass coefficients at the decomposition level; and
means for recombining the plurality of decompressed tiles into an image.

11. The apparatus defined in claim 10 further comprising:
means for dividing image data into a plurality of tiles; and
means for compressing the plurality of tiles individually to create the plurality of sets of compressed data.

12. An apparatus for processing data, the method comprising:
means for decompressing a plurality of sets of compressed data, the means for decompressing the plurality of sets of compressed data including means for performing detiling on a first set of compressed data using neighbor information from at least one other set of compressed data, wherein the means for performing detiling comprises:
means for computing the inverse discrete wavelet transform (DWT) on a tile;
means for iteratively performing the following
computing lowpass coefficients shifted by one position near a tile boundary;
computing the forward DWT at the tile boundary using only lowpass coefficients; and
computing the inverse DWT at the tile boundary using only lowpass coefficients; and
means for recombining the plurality of decompressed tiles into an image.

13. The apparatus defined in claim 12 further comprising means for making samples consistent with quantization after decompression.

14. An apparatus for processing data, the method comprising:
means for decompressing a plurality of sets of compressed data, the means for decompressing the plurality of sets of compressed data including means for performing detiling on a first set of compressed data using neighbor information from at least one other set of compressed data, wherein the means for performing detiling comprises:
means for computing the inverse discrete wavelet transform (DWT) on a tile;
means for iteratively performing the following
computing lowpass coefficients shifted by one position near a tile boundary,
computing the forward DWT at the tile boundary using only lowpass coefficients, and
computing the inverse DWT at the tile boundary using only lowpass coefficients;
computing the forward tile DWT;
quantizing coefficients generated by performing the forward tile DWT; and
computing an inverse tile DWT; and
means for recombining the plurality of decompressed tiles into an image.

15. A wavelet-based system comprising:
a plurality of decompressors to decompress coefficients into a plurality of tiles-using a wavelet transform, the plurality of decompressors operable to perform detiling by modifying tile high and low pass coefficients at a decomposition level using neighboring highpass and lowpass coefficients at the decomposition level; and
a recombiner to recombine decompressed tiles into an image.

16. The system defined in claim 15 further comprising:
a tiling block to convert image data into the plurality of tiles; and
a plurality of compressors coupled to the tiling block, each of the plurality of compressors compressing one of the plurality of tiles individually.

17. The system defined in claim 16 wherein each of the plurality of compressors comprises:
   a multi-level forward wavelet transform; and
   a coder coupled to the multi-level wavelet transform.

18. The system defined in claim 17 wherein the forward wavelet transform comprises a multi-level transform.

19. The system defined in claim 17 wherein each of the plurality of decompressors comprise:
   a decoder; and
   a multi-level inverse wavelet transform coupled to the decoder.

20. The system defined in claim 19 wherein the transform comprises a multi-level transform.

21. The system defined in claim 19 wherein at least one level of the multi-level inverse transform comprises:
   a coefficient adjustment mechanism to generate detiled coefficients in response to input coefficients from the same tile and coefficients from other tiles; and
   a two-dimensional wavelet transform coupled to the coefficient adjustment mechanism.

22. A wavelet-based system comprising:
   a plurality of decompressors to decompress coefficients into a plurality of tiles using a wavelet transform, the decompression block performing detiling on a first set of compressed data using neighbor information from at least one other set of compressed data, wherein the plurality of decompressors perform detiling by modifying tile high and low pass coefficients at a decomposition level using neighboring highpass and lowpass coefficients at the decomposition level, and further wherein each of the plurality of decompressors comprise
      a decoder, and
      a multi-level inverse wavelet transform coupled to the decoder, wherein at least one level of the multi-level inverse transform comprises
         a detiling inverse wavelet transform to generate samples in response to coefficients in the same tile and coefficients from other tiles; and
         a non-detiling inverse wavelet transform coupled to receive coefficients to generate samples on a second output; and
         a control coupled to select the first or second output as the output of at least one level of the inverse transform based on whether the samples are effected by a tile boundary; and
   a recombiner to recombine decompressed tiles into an image.

23. A method comprising:
   decoding coded data to generate a plurality of coefficients; and
   performing a multi-level inverse wavelet transform on the plurality of coefficients, wherein performing the multi-level inverse wavelet transform comprises
      performing a coefficient adjustment to tile boundary coefficients in at least one decomposition level to generate detiled coefficients, wherein performing a coefficient adjustment comprises generating an approximation coefficient at scale J–1 using precomputed filter coefficients on the scaling and wavelet coefficients at scale J; and
      applying an inverse wavelet transform to the detiled coefficients to generate data samples.

24. The method defined in claim 23 wherein the filter coefficients comprise applying a multiplication factor to scaling and wavelet coefficients at scale J and adding these multiplication products to generate the approximation coefficient.

25. A method comprising:
   decoding coded data to generate a plurality of coefficients; and
   performing a multi-level inverse wavelet transform on the plurality of coefficients, wherein performing the multi-level inverse wavelet transform comprises
   performing a coefficient adjustment to tile boundary coefficients in at least one decomposition level to generate detiled coefficients, wherein performing a coefficient adjustment comprises generating an approximation coefficient at scale J–1 using precomputed filter coefficients on the scaling and wavelet coefficients at scale J, wherein the filter coefficients satisfy the following condition:

$$1/2F(z)[A(-z^2)]\times(z)=T_{F_j}\cdot_F F(z)\times(z).$$

26. A method comprising:
   compute scaling coefficients for a tile wavelet decomposition at level J–1 by applying a tile inverse transform to scaling and wavelet coefficients at level J;
   compute an approximation of full-frame coefficients at level J by applying a full-frame forward transform to a shifted sequence of s coefficients at level J–1;
   computing an approximation of the full-frame coefficients at level J–1 by applying an inverse full-frame wavelet transform to the shifted sequence of s coefficients;
   computing an approximation of the s coefficients at level J by applying a forward tile transform to the approximation of the full-frame coefficients.

27. The method defined in claim 26 wherein computing approximation of full-frame coefficients at level J–1 comprises iteratively applying the inverse and forward full-frame wavelet transform to the s coefficients until approximations for all s coefficients at level J–1 are obtained.

28. A method comprising:
   decoding coded data to generate a plurality of coefficients; and
   performing a multi-level inverse wavelet transform on the plurality of coefficients to generate detiled coefficients, wherein performing the multi-level inverse wavelet transform comprises generating approximations for coefficients near tile boundaries, wherein an approximation of full-frame scaling coefficients $s^j$ is $\bar{s}^j$.

29. An apparatus comprising:
   means for decoding coded data to generate a plurality of coefficients; and
   means for performing a multi-level inverse wavelet transform on the plurality of coefficients, wherein the means for performing the multi-level inverse wavelet transform comprises
      means for performing a coefficient adjustment to tile boundary coefficients in at least one decomposition level to generate detiled coefficients, wherein the means for performing a coefficient adjustment comprises means for generating an approximation coefficient at scale J–1 using precomputed filter coefficients on the scaling and wavelet coefficients at scale J, and
      means for applying an inverse wavelet transform to the detiled coefficients to generate data samples.

30. The apparatus defined in claim 29 further comprising means for decoding coded data to generate a plurality of coefficients; and means for performing a multi-level inverse wavelet transform on the plurality of coefficients to generate detiled coefficients, wherein the means for performing the multi-level inverse wavelet transform generates approximations for coefficients near tile boundaries, wherein an approximation of full-frame scaling coefficients $s^J$ is $\bar{s}^J$.

31. An apparatus comprising:

means for decoding coded data to generate a plurality of coefficients; and means for performing a multi-level inverse wavelet transform on the plurality of coefficients, wherein the means for performing the multi-level inverse wavelet transform comprises means for performing a coefficient adjustment to tile boundary coefficients in at least one decomposition level to generate detiled coefficients using filter coefficients, wherein the filter coefficients satisfy the following condition:

$$1/2F(z)[A(-z^2)] \times (z) = T_{F_j \cdot F} F(z) \times (z), \text{ and}$$

means for applying an inverse wavelet transform to the detiled coefficients to generate data samples.

32. An apparatus comprising:

means for decoding coded data to generate a plurality of coefficients; and means for performing a multi-level inverse wavelet transform on the plurality of coefficients, wherein the means for performing the multi-level inverse wavelet transform comprises means for performing a coefficient adjustment to tile boundary coefficients in at least one decomposition level to generate detiled coefficients, and means for applying an inverse wavelet transform to the detiled coefficients to generate data samples, and further comprising:

means for computing scaling coefficients for a tile wavelet decomposition at level J–1 by applying a tile inverse transform to scaling and wavelet coefficients at level J;

means for computing an approximation of full-frame coefficients at level J by applying a full-frame forward transform to a shifted sequence of s coefficients at level J–1;

means for computing an approximation of the full-frame coefficients at level J–1 by applying an inverse full-frame wavelet transform to the shifted sequence of s coefficients;

means for computing an approximation of the s coefficients at level J by applying a forward tile transform to the approximation of the full-frame coefficients.

33. The apparatus defined in claim 32 wherein the means for computing approximation of full-frame coefficients at level J–1 comprises means for iteratively applying the inverse and forward full-frame wavelet transform to the s coefficients until approximations for all s coefficients at level J–1 are obtained.

34. A method for processing data comprising:

decompressing a plurality of tiles of compressed data, wherein decompressing the plurality of sets includes performing detiling using the phase of coefficients other than that generated with a discrete wavelet transform; and recombining decompressed tiles to create a reconstructed image.

35. The method defined in claim 34 wherein the phase of coefficients comprises a shifted sequence of the original coefficients.

36. The method defined in claim 34 wherein performing detiling comprises obtaining scaling coefficients of a shifted version of the discrete wavelet transform.

37. A method for detiling comprising:

computing coefficients for tile wavelet decomposition level J–1 by applying an inverse tile transform to coefficients from level J;

computing approximations of full-frame coefficients at level J by applying an analysis low pass operator H to the coefficients of the tile wavelet decomposition level J–1;

computing an approximation of full-frame coefficients at level J–1 by applying a synthesis low pass operator H* to approximation coefficients at level J; and applying a forward tile transform to J–1 approximation coefficients to computing new coefficients for level J.

38. A method comprising:

correcting tile highpass coefficients at a scale using neighboring lowpass coefficients at the scale based on a target image obtained by generating, at each reconstruction level J, using a full-frame wavelet decomposition of an original image modified only at highpass coefficients at level J that are effected by boundary corrections in the tile transform with modified coefficients set to zero.

* * * * *